(12) United States Patent
Wade

(10) Patent No.: US 12,252,895 B2
(45) Date of Patent: Mar. 18, 2025

(54) FENCE POST

(71) Applicant: Gallagher Group Limited, Hamilton (NZ)

(72) Inventor: Robert Andrew Wade, Hamilton (NZ)

(73) Assignee: Gallagher Group Limited, Hamilton (NZ)

( * ) Notice: Subject to any disclaimer, the term of this patent is extended or adjusted under 35 U.S.C. 154(b) by 878 days.

(21) Appl. No.: 15/999,686

(22) PCT Filed: Feb. 17, 2017

(86) PCT No.: PCT/NZ2017/050017
§ 371 (c)(1),
(2) Date: Aug. 20, 2018

(87) PCT Pub. No.: WO2017/142426
PCT Pub. Date: Aug. 24, 2017

(65) Prior Publication Data
US 2019/0085587 A1    Mar. 21, 2019

(30) Foreign Application Priority Data
Feb. 19, 2016   (NZ) ........................................ 717229

(51) Int. Cl.
*E04H 17/12*     (2006.01)
*E04H 17/00*     (2006.01)
(Continued)

(52) U.S. Cl.
CPC ........... *E04H 17/12* (2013.01); *E04H 17/009* (2021.01); *E04H 17/017* (2021.01);
(Continued)

(58) Field of Classification Search
CPC .... A01K 3/005; E04H 17/006; E04H 17/009; E04H 17/017; E04H 17/06; E04H 17/08;
(Continued)

(56) References Cited

U.S. PATENT DOCUMENTS 383,222 A * 5/1888 Guile .................... E04H 17/124
  52/157
2,955,150 A * 10/1960 Wilson ................. H01B 17/145
  174/209
(Continued)

FOREIGN PATENT DOCUMENTS

CA    2242138 A1 *  2/1999  ......... E04H 12/2215
CH    614993  A5 * 12/1979
(Continued)

OTHER PUBLICATIONS

Tiger Mfg. Co., Ltd., "Support/Pole", retrieved from the Internet Archive WaybackMachine on Aug. 21, 2016 at https://web.archive.org/web/20160821222338/http:/www.tiger-mfg.co.jp:80/pole.html; 2 pages.
(Continued)

*Primary Examiner* — Josh Skroupa
*Assistant Examiner* — Zachary A Hall
(74) *Attorney, Agent, or Firm* — Bradley Arant Boult Cummings LLP; Henry B. Ward, III

(57) ABSTRACT

A fence system, post, and method of manufacture are herein disclosed. The post includes a shaft, and an overmold layer extending at least a portion of a length of the shaft. The overmold layer includes a plurality of external attachment locating features for selectively securing wire locating attachments at predetermined locations along the length of the shaft. The fence system includes a plurality of the posts and a plurality of wire locating attachments configured to be attached to the external attachment locating features of the posts.

16 Claims, 17 Drawing Sheets

(51) Int. Cl.
*H01B 17/14* (2006.01)
*A01K 3/00* (2006.01)

(52) U.S. Cl.
CPC ............ *H01B 17/145* (2013.01); *A01K 3/005* (2013.01); *E04H 17/006* (2021.01)

(58) Field of Classification Search
CPC ....... E04H 17/10; E04H 17/12; E04H 17/124; E04H 17/20; E04H 17/24; E04H 17/21; Y10T 403/45; Y10T 403/453; Y10T 403/459; Y10T 403/54; F16C 1/04; H01B 17/145
USPC ......... 256/10, 32, 47, 48, 50, 51, 52; 464/78
See application file for complete search history.

(56) References Cited

U.S. PATENT DOCUMENTS

| | | | | |
|---|---|---|---|---|
| 3,844,137 A * | 10/1974 | Zugel | ............ | F16D 3/72 464/78 |
| 4,054,269 A | 10/1977 | Stabler | | |
| 4,124,198 A * | 11/1978 | Wong | ............ | E04H 17/16 256/19 |
| 4,175,883 A * | 11/1979 | Lemelson | ............ | E04H 17/20 256/65.14 |
| 4,290,712 A * | 9/1981 | Hayes | ............ | E01F 9/608 52/297 |
| 4,470,579 A * | 9/1984 | Aho | ............ | A01K 3/005 256/10 |
| 5,085,409 A | 2/1992 | Teixeira | | |
| 5,876,021 A * | 3/1999 | Spence | ............ | E04F 11/1842 256/19 |
| 6,330,998 B1 * | 12/2001 | Roy | ............ | E04H 17/12 256/19 |
| 6,691,479 B1 * | 2/2004 | Tscharner | ............ | A01G 17/14 74/543 |
| 7,451,964 B2 * | 11/2008 | Hamm | ............ | E04H 17/20 256/65.01 |
| 7,500,653 B1 * | 3/2009 | Hartman | ............ | E04H 17/24 256/1 |
| 7,621,940 B2 * | 11/2009 | Harms | ............ | A61B 17/7026 606/257 |
| 7,968,797 B2 * | 6/2011 | Williams | ............ | A01K 3/005 174/154 |
| 8,105,368 B2 * | 1/2012 | Jackson | ............ | A61B 17/7025 606/326 |
| 8,646,735 B2 * | 2/2014 | Bradley | ............ | E04H 17/20 256/65.02 |
| 9,142,337 B2 * | 9/2015 | Nelson | ............ | A01K 3/005 |
| 9,333,009 B2 * | 5/2016 | Kroll | ............ | A61B 17/7002 |
| 9,463,013 B2 * | 10/2016 | Pilgeram | ............ | A61B 17/0401 |
| 9,743,957 B2 * | 8/2017 | Jackson | ............ | A61B 17/70 |
| 10,188,429 B2 * | 1/2019 | Carlson | ............ | A61B 17/7053 |
| 10,420,588 B2 * | 9/2019 | Murray | ............ | A61B 17/7028 |
| 2003/0136953 A1 * | 7/2003 | Phillips | ............ | E04H 17/161 256/1 |
| 2005/0092976 A1 * | 5/2005 | Steffes | ............ | E04H 17/20 256/1 |
| 2006/0036240 A1 * | 2/2006 | Colleran | ............ | A61B 17/7025 606/86 A |
| 2006/0276247 A1 * | 12/2006 | Martinez | ............ | F16C 1/02 464/78 |
| 2008/0001134 A1 * | 1/2008 | Coley | ............ | E04H 17/124 256/1 |
| 2008/0306536 A1 * | 12/2008 | Frigg | ............ | A61B 17/7002 606/246 |
| 2009/0039328 A1 * | 2/2009 | Davidson | ............ | E04H 17/20 256/66 |
| 2009/0281575 A1 * | 11/2009 | Carls | ............ | A61B 17/7014 606/278 |
| 2009/0301759 A1 | 12/2009 | Williams | | |
| 2010/0308292 A1 | 12/2010 | Rawls | | |
| 2011/0047896 A1 * | 3/2011 | Vosbikian | ............ | A45F 3/44 52/165 |
| 2011/0146187 A1 * | 6/2011 | Inman | ............ | E04H 17/009 52/578 |
| 2012/0261164 A1 * | 10/2012 | McKinnon | ............ | H01B 17/145 174/158 F |
| 2013/0231703 A1 * | 9/2013 | Seme | ............ | A61B 17/8869 606/252 |
| 2013/0328000 A1 | 12/2013 | Hendricks | | |
| 2015/0060108 A1 | 3/2015 | McKinley et al. | | |
| 2017/0051528 A1 * | 2/2017 | Munro | ............ | E04H 17/24 |

FOREIGN PATENT DOCUMENTS

| | | | | |
|---|---|---|---|---|
| DE | 2609165 A1 * | 9/1977 | | |
| EP | 0812761 A2 * | 12/1997 | ............ | B62K 25/28 |
| EP | 0945567 A2 | 9/1999 | | |
| FR | 2323848 A1 | 4/1977 | | |
| GB | 815755 A * | 7/1959 | ............ | H01B 17/145 |
| KR | 20030071011 A | 9/2003 | | |
| WO | WO-2011038424 A2 * | 3/2011 | ............ | A01K 3/005 |
| WO | WO-2015121814 A2 * | 8/2015 | ............ | E04H 17/08 |

OTHER PUBLICATIONS

PCT; International Search Report dated May 3, 2017, cited in PCT/NZ2017/050017, 3 pages.

Office Action issued by the European Patent Office for European Patent Application No. 17753560.6, dated Jul. 16, 2021.

* cited by examiner

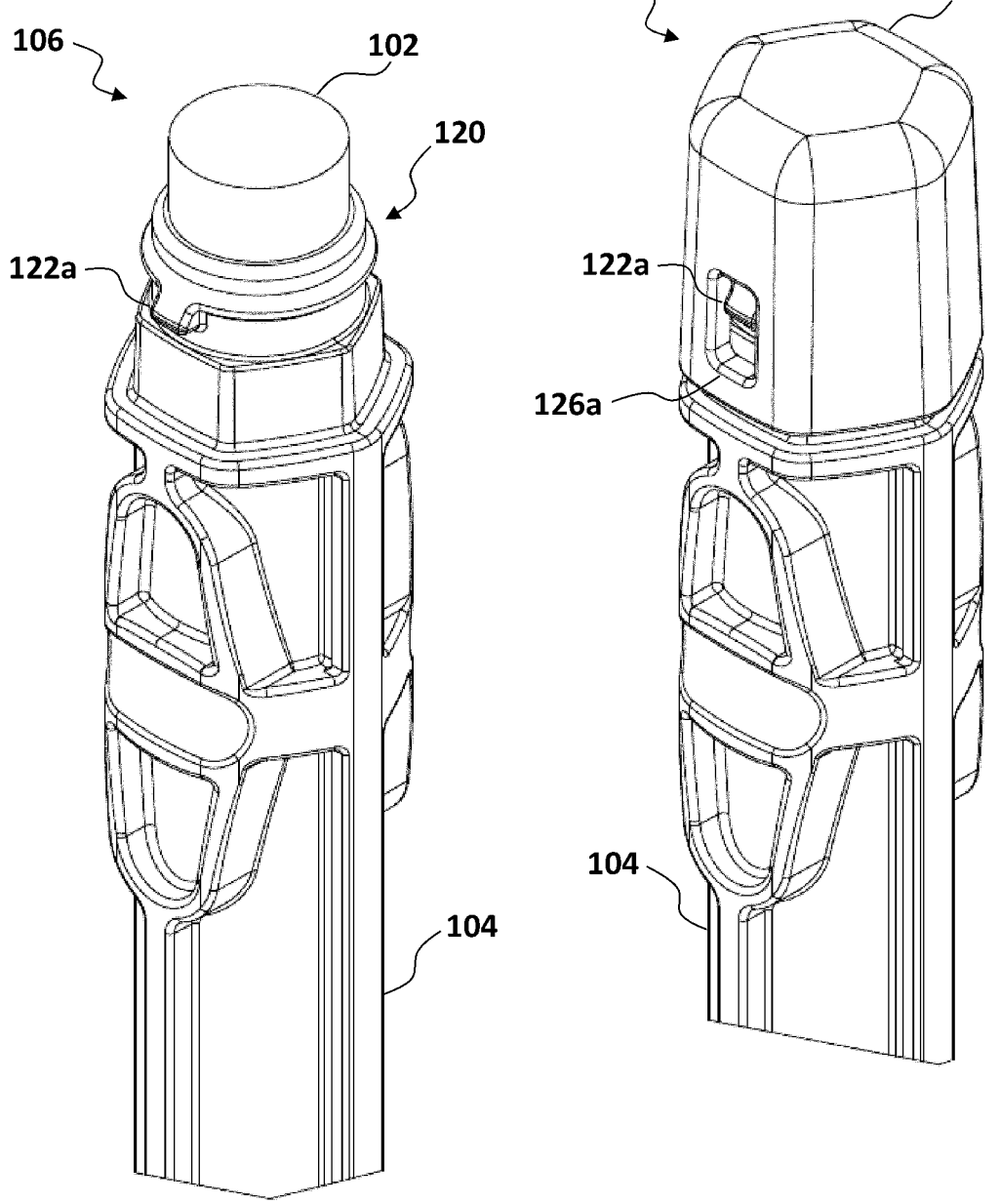

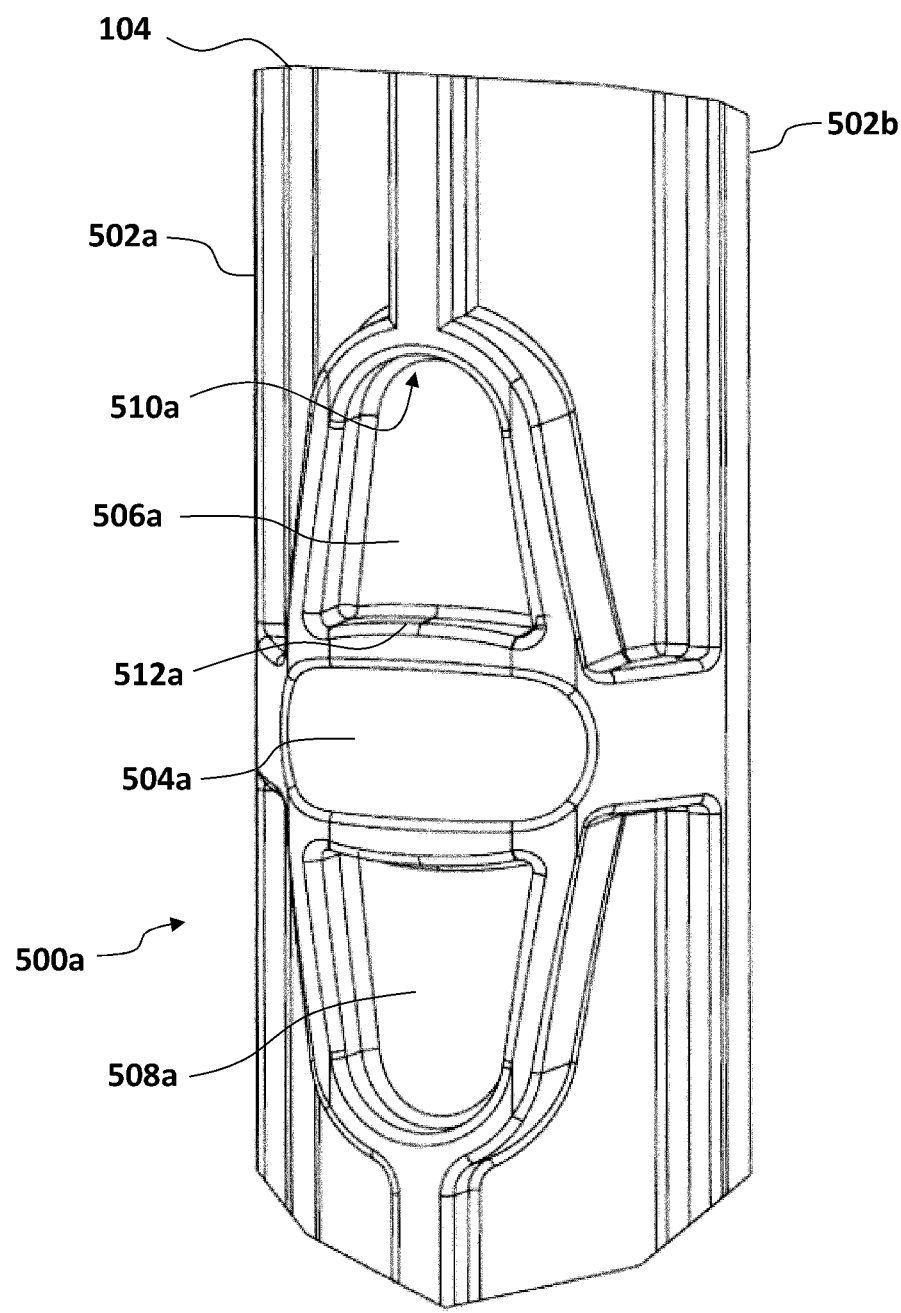

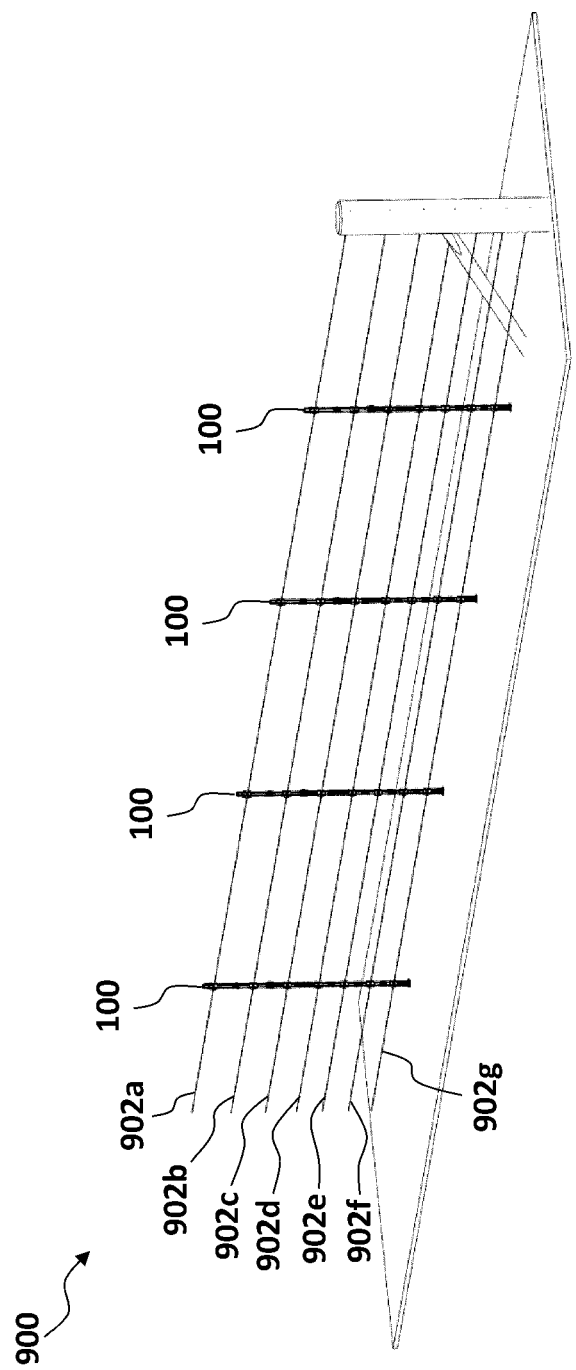

FENCE POST

TECHNICAL FIELD

The present disclosure relates to a fence post—more particularly a fence post intended for use in an electric fence system.

STATEMENT OF CORRESPONDING APPLICATIONS

This application is based on the provisional specification filed in relation to New Zealand Patent Application No. 717229, the entire contents of which are incorporated herein by reference.

BACKGROUND

Electric fencing is well known, particularly in animal husbandry. It is typically used to partition areas of pasture to be grazed by livestock—or conversely to prevent access.

An electric fence has three key components: at least one conductive wire, an energiser, and fence posts to carry the wire(s). The energiser supplies electric current to the wire, and an animal or person coming into contact with the wire will receive an electric shock.

The wire must be supported along its length by one or more fence posts to ensure that the wire is at a height which forms an effective barrier to the animals being enclosed or excluded. The connection of the wire to the posts must be electrically insulated from ground, or short circuiting will greatly reduce the efficacy of the fence.

Further, even if a fence is not electrified, fence posts which are intended to remain in place either permanently or at least for a lengthy period of time need to have sufficient strength to resist being pushed over by animals.

It is also important to maintain a consistent height of the wire(s) relative to ground (and each other) along the length of the fence to prevent gaps being created, or a higher likelihood of short-circuits occurring due to proximity to vegetation or neighbouring wires.

Several types of fence posts are known for permanent or semi-permanent fencing applications.

Wooden posts are widely used, but are time consuming to install—both with regard to placement in the ground but also securing insulators to the post for supporting the wires. Fastening of the insulators to the post also frequently introduces tracking issues between the wire and post due to the conductive nature of the fasteners (commonly metal nails)

To secure the wire to the post the insulators often have pins or claws molded with the body. The pins are difficult to remove and farmers find this frustrating.

Steel posts are excellent earthing stakes, and require insulation to stop wires coming into contact with the post. Plastic insulators are fitted to the post to provide sufficient electrical isolation. These insulators are generally secured to the post using pins located in pre-formed holes. However, users find separating the pins from the insulator body frustrating, and the pins also have a tendency to break or pull through the body of the insulator. The insulators are also difficult to remove from the bag as the pins are generally attached to the body by a tether.

Fiberglass posts are light and relatively strong for their weight, but are typically very smooth and therefore difficult to attach wires to. Some wire attachment systems use steel torsion springs to grip the shaft, but these have a tendency to slide down the post and then require repositioning—particularly where the ground is undulating. Other wire attachment systems use a clamping arrangement with a threaded fastener—but again these are susceptible to movement and are relatively time intensive to install.

TIGER MFG. CO., LTD. (http://www.tiger-mfg.co.ip/) offers "animal poles" for fencing in which a fibreglass core shaft is overmolded with a thin layer of polypropylene, and a number of permanently molded wire connection features dispersed along its length. This post is only 20 mm in diameter, and does not provide any significant lateral resistance in the ground to keep it in place once installed. Further, the permanently molded wire connection features cannot be replaced if broken.

It is an object of the present invention to address the foregoing problems or at least to provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

Unless the context clearly requires otherwise, throughout the description and the claims, the words "comprise", "comprising", and the like, are to be construed in an inclusive sense as opposed to an exclusive or exhaustive sense, that is to say, in the sense of "including, but not limited to".

Further aspects and advantages of the present invention will become apparent from the ensuing description which is given by way of example only.

SUMMARY

According to one aspect of the present invention there is provided a post, including a shaft. The post may include an overmold layer extending at least a portion of a length of the shaft, wherein the overmold layer includes a plurality of external attachment locating features for selectively securing wire locating attachments at predetermined locations along the length of the shaft.

Generally, reference to a post should be understood to mean an elongate member intended to be positioned in an upright orientation in use, particularly for supporting one or more wires above the ground to produce a fence. The post may include a foot at one end, configured to be inserted into the ground. The end of the post at this end may be referred to as the tip. The distal end of the post may be referred to as "the end" or head. However, while it is envisaged that the post may be generally configured as described above (i.e. to be inserted into the ground) it should be appreciated that in exemplary embodiments the post may be configured to be secured to a primary structure—for example, acting as an extension to a post inserted in the ground, or a standoff from such a post.

It should be appreciated that reference to "wire" in the present disclosure is intended to encompass various forms of the fencing element which may be suspended from posts to form a barrier there between, for example: single filament metal wires, tapes, braids, and so forth.

Reference to a shaft should be understood to mean an elongate structural member forming the core of the post, whether solid or hollow in its cross-section. It is envisaged the shaft may be made of a material which has one or more of the following properties: a relatively high elasticity to allow for flexure under heavy loading (such as a round bail rolling over the fence line) which having sufficient rigidity and strength to maintain a barrier to animals, low material cost in comparison with steel or wood, sufficient weather resistance and UV resistance to provide a fairly long outdoor life (for example, in the order of 20 years, and electrical insulation.

In an exemplary embodiment the shaft may be made of a fibre-reinforced plastics material. Reference to fibre-reinforced plastics should be understood to mean a composite material made of a polymer matrix reinforced with fibres to mechanically enhance the strength and elasticity of the polymer.

For example, the shaft may be made of fiberglass. Fiberglass has been identified as an example of a material with properties well suited to the present application, as discussed above, in combination with aspects such as the overmold to protect against UV damage.

In an exemplary embodiment the shaft may include at least one external locating feature to assist with locating the shaft relative to the overmold layer. For example, the shaft may include at least one annular recess into which the overmold layer extends, to restrict longitudinal movement of the shaft relative to the overmold layer.

Reference to an overmold layer should be understood to mean a layer molded about a separate part—i.e. the shaft. Further description of exemplary embodiments of the method of manufacture of the post are described further below.

The overmold layer provides a base for the provision of external attachment locating features. It is also envisaged that the overmold layer may act as a protective covering for shafts made of a fibre-reinforced plastics material, reducing the likelihood of a user being exposed to splinters, and also providing protection for the shaft itself against degradation due to UV exposure. It is also envisaged that the overmold layer may facilitate the molding of a foot to be inserted into the ground with features to provide stability to the post—for example as discussed in greater detail further below.

In an exemplary embodiment the shaft may be centralised within the overmold layer—i.e. the longitudinal axis of the shaft may be substantially aligned with the longitudinal axis of the overmold layer. Centralising the shaft may assist in producing a consistent wall thickness of the overmold layer, which may reduce the likelihood of warping or cracking in the overmold layer due to stresses introduced by disparate cooling times in sections of different thickness.

In an exemplary embodiment the overmold layer may extend along at least 50% of a length of the shaft. In an exemplary embodiment the overmold layer may extend along at least 90% of a length of the shaft.

In an exemplary embodiment, the overmold layer may be produced in more than one overmolding step. This may allow a mold configured for production of a post with a first length to produce the majority of an overmold layer for a longer post with a longer shaft. A secondary mold may be used to mold the shorter overmold onto the exposed length of shaft, and potentially finish the post in a smaller tool and overmold the remaining post detail.

The overmold layer may be made of any suitable material known to a person skilled in the art. For example, the overmold layer may be made of a plastics material. In an exemplary embodiment the overmold layer may be made of a different plastics material to the shaft. In an exemplary embodiment the overmold layer may be made of polyethylene—more particularly high density polyethylene (HDPE). HDPE is seen by the applicant as a relatively low cost material with desirable properties with regard to resisting degradation in outdoor conditions, as well as providing good electrical insulation. The applicant has identified that this material may cause difficulties in the molding process due to a relatively high viscosity and associated complications in long flow lengths (such as in the case of a post), and high shrinkage rates, however these may be managed with one or more of the techniques or features described herein.

It should be appreciated that this is not intended to be limiting, and that other specific examples of potential materials for the overmold layer include glass filled nylon, glass filled polypropylene, and poly-vinyl chloride.

In an exemplary embodiment, the overmold layer may extend over at least one end of the shaft.

In an exemplary embodiment, at least one end of the shaft extends beyond the overmold layer.

In an exemplary embodiment, the post may include at least one cap, configured to be attached to the overmold layer and fit over an end of the shaft extending beyond the overmold layer.

In an exemplary embodiment the post may include an end cap. It is envisaged that the end cap may provide a visually pleasing interface between the end of the shaft and the end of the overmold layer.

For example, the overmold layer may include one or more lateral catches, with the end cap including one or more slots extending along the longitudinal axis of the post and configured to receive the catches. The slots may accommodate shrinkage of the overmold layer down the shaft, while resisting further shrinkage beyond a designated point.

In an exemplary embodiment the end cap may include an internal face configured to bear against the exposed end of the shaft. The end cap may be made of a tougher material than the overmold layer—for example, a glass filled nylon. It is envisaged that the post may be installed by ramming against the end of the post, and the tougher end cap may be better suited to transferring energy to the shaft without being damaged than the material the overmold layer may be made of.

In an exemplary embodiment the post may include a tip cap. In an exemplary embodiment the tip cap may be made of a tougher material than the overmold layer—for example a glass filled nylon, or in some embodiments steel or stainless steel for use in stonier ground. Further, it is envisaged that the tip cap may play a role in locating the shaft within the cavity of the mold during manufacture—described in greater detail below.

In an exemplary embodiment the tip cap may have a larger diameter than the overmolded portion of the foot—i.e. the diameter of the tip cap may be larger than a portion of the overmold layer surrounding the shaft and adjacent the tip cap. This may provide a pilot hole, making it easier to insert the remainder of the foot portion of the post in the ground. It is envisaged that this may also provide a space in the ground for the material displaced by the blades to compact back into around the foot portion of the shaft, and provide a barb type effect when withdrawing the post from the ground.

Reference to an attachment locating feature should be understood to mean a structural feature intended to facilitate the securing of a separate part in a predetermined location, and restrict movement of that part from the predetermined location.

Similarly, a wire locating attachment should be understood to mean a part having structural features intended to interact with an attachment locating feature of the post to secure it to the post in a predetermined location. In an exemplary embodiment the overmold layer may be configured such that a wire locating attachment can only be attached to the post at an attachment locating feature.

In the context of fencing, it may be desirable to ensure consistent positioning of a wire relative to each post in a series of posts in a fence line. In exemplary embodiments in which the wire locating attachment is a distinct part (i.e. not integral with the overmolded portion), the provision of the attachment locating features may reduce the likelihood of wires being secured at uneven heights, in addition to restricting subsequent movement from those positions.

The wire locating attachment may be configured to retain the wire using any suitable means known in the art. For example, the wire locating attachment may include an open ended loop (for example, a "pigtail" as known in the art of electric fencing), one or more claws, a pin locking device, and so on.

In an exemplary embodiment, the wire locating attachment may be configured to produce an aperture in combination with the overmold layer when secured to the post, through which the wire may pass.

In an exemplary embodiment the wire locating attachment may be made of an electrically insulating material—for example, a plastics material. The applicant has identified that the material used for the wire locating attachment may ideally have one or more of the following properties: good weather resistance and stability in exposed conditions, high strength, excellent wear resistance, and be dimensionally stable. For example, the wire locating attachment may be made of a glass fibre reinforced nylon.

However, it should be appreciated that this is not intended to be limiting, and in an exemplary embodiment the wire locating attachment may be made of an electrically conductive material. In such an embodiment the overmold layer may be used to provide insulation from ground.

In an exemplary embodiment the wire locating attachment may include a body. In an exemplary embodiment the wire locating attachment may include at least one pair of arms configured to extend about at least a portion of the overmold layer.

In an exemplary embodiment the attachment locating feature may include at least one elongate locating feature extending longitudinally along at least a portion of a side of the overmold layer.

In an exemplary embodiment, the elongate locating feature may be a ridge protruding from the overmold layer—although it should be appreciated that the elongate locating feature may take other forms—for example an elongate recess.

In an exemplary embodiment the attachment locating feature may include at least one elongate locating feature extending longitudinally along at least a portion of opposing sides of the overmold layer.

In an exemplary embodiment at least one of the arms of the wire locating attachment may include a catching surface configured to bear against a surface of the elongate locating feature. In an exemplary embodiment the catching surface may be provided by a protrusion at an end of an arm distal from the body—essentially acting as the hook of a barb.

The interaction of the catching surface and the surface of the elongate locating feature may be intended to restrict radial movement of the wire locating attachment away from the post, as well as axial movement around the post, until released by a user.

In an exemplary embodiment the attachment locating features may include at least one transverse locating feature, configured to restrict longitudinal movement of the wire locating attachment relative to the post. The transverse locating feature may include at least one surface extending in a transverse orientation relative to the longitudinal axis of the post—i.e. facing towards an end of the post.

In an exemplary embodiment, the transverse locating feature may include a recess in the overmold layer—although it should be appreciated that the transverse locating feature may take other forms—for example a protrusion.

In an exemplary embodiment the wire locating attachment may include at least one locating feature configured to interact with the transverse locating feature of the overmold. For example, where the transverse locating feature is a recess, the locating feature of the wire locating attachment may be a protrusion complementary in shape to the recess.

In an exemplary embodiment the locating feature of the wire locating attachment may be positioned on a surface of the body facing the overmold layer when secured to the post. In an exemplary embodiment the locating feature of the wire locating attachment may be positioned on a surface of at least one of the arms facing the overmold layer when secured to the post.

In an exemplary embodiment the attachment locating feature may include a transverse groove. It is envisaged that the transverse groove may define, at least in part, a pathway for a wire to be supported by the post. In an exemplary embodiment, the wire locating attachment may be configured to be secured to the overmold layer to produce an aperture in combination with the transverse groove.

In an exemplary embodiment the wire locating attachment may include two pairs of arms, each pair of arms spaced apart on the body of the wire locating attachment with a gap between them. It is envisaged that the gap may be aligned with the transverse groove.

Similarly, at least one of the transverse locating features may be positioned to assist in aligning the wire locating attachment with the transverse groove.

According to one aspect of the present disclosure there is provided a post, including a shaft, wherein the shaft includes a plurality of external attachment locating features for selectively securing wire locating attachments at predetermined locations along the length of the shaft.

In the overmolding process, cooling of the material used to form the overmold layer results in shrinkage. This may be more pronounced in molding shapes with long flow lengths—such as an elongate fence post as in the present disclosure. For example, in the case of HDPE, the shrinkage may be in the order of 2% (depending on the grade of material), and for a post approximately 1500 mm in length this may result in potential shrinkage movement in the order of 30 mm. It has been identified that although plastics materials which may be used to form the overmold layer may be elastic in nature, the formation of the attachment locating features may introduce stress raiser points that concentrate the level of stress introduced by this movement and increase susceptibility to cracking of the overmold layer.

In an exemplary embodiment the overmold layer may include at least one stress relief feature. A stress relief feature should be understood to mean a structural feature of the overmold layer configured to accommodate the movement of the overmold layer relative to the shaft due to deformation—whether during manufacture or in operation.

According to an exemplary embodiment of the present disclosure there is provided a post, including a shaft. The post may include an overmold layer extending at least a portion of a length of the shaft, wherein the overmold layer includes at least one stress relief feature.

In an exemplary embodiment the at least one stress release feature may be positioned between portions of the overmold layer continuously surrounding the shaft.

In an exemplary embodiment the overmold layer may include a plurality of stress relief features spaced apart along the longitudinal axis of the shaft. It is envisaged that the stress relief features may be evenly distributed along the longitudinal length of the overmold layer, although it should be appreciated that this is not intended to be limiting to every embodiment of the present disclosure.

In an exemplary embodiment the stress relief feature may include a plurality of transverse stress relief members surrounding the shaft, and spaced apart along the shaft, wherein neighbouring stress relief members are connected by link members on one side of the shaft, alternating between sides along the stress relief feature. It is envisaged that this structure may effectively act as a series of relatively short cantilever beams stacked on top of each other in alternating directions. In an exemplary embodiment each transverse stress relief member may be substantially disc-shaped, having a central aperture for receiving the shaft.

As another explanation of this structure, the stress relief feature may include a series of transverse slots in the overmold layer, entering from alternating sides of the shaft.

It should be appreciated that this is not intended to be limiting to all embodiments of the present disclosure. For example, in an exemplary embodiment the stress relief feature may include one or more of: a series of transverse slots in the overmold layer entering from different but not opposing directions, a helix, a necked section allowing for stretch, breaks in the overmold, a separately molded stress relief feature as detailed above and slid onto the shaft prior to applying the overmold, or floating end caps in which the shrinkage of the overmold draws the end cap tightly onto the shaft.

In an exemplary embodiment the stress relief feature may include at least one opening exposing the shaft. It is envisaged that this may provide an opportunity to centralise the shaft within the overmold tooling without the inclusion of additional clips or tool features to achieve this. Rather, the tool feature(s) used to produce the stress relief feature may be used to support or locate the shaft in the desired position.

In an exemplary embodiment the stress relief feature may include a plurality of openings that provide an opportunity to support the shaft at multiple points along its length. In an exemplary embodiment at least three points on the shaft may be supported to aid in centralising the shaft while injecting the overmold layer.

In an exemplary embodiment the stress relief feature may be continuous with the overmold layer. In an exemplary embodiment, the cross-sectional area of the stress relief feature at any one point in a flow path of a mold used to produce the overmold may be at least 30 $mm^2$. In an exemplary embodiment, the cross-sectional area of the stress relief feature at any one point in a flow path of a mold used to produce the overmold may be in the range of about 30 to 40 $mm^2$. In an exemplary embodiment, the cross-sectional area of the stress relief feature at any one point in a flow path of a mold used to produce the overmold may be about 34 $mm^2$.

In an exemplary embodiment the post may include a foot at one end of the shaft, configured to be inserted into the ground to locate the post in place.

In an exemplary embodiment the overmold layer may include a substantial portion of the foot—i.e. the foot may be unitary with the overmold layer.

In an exemplary embodiment the foot may include an elongate shaft portion coaxial with the longitudinal axis of the shaft. In an exemplary embodiment the foot may include at least one fin extending along at least a portion of the elongate shaft portion. In an exemplary embodiment the foot may include a plurality of fins.

In an exemplary embodiment, at least one fin may include a series of alternating ridges and grooves on at least one surface. It is envisaged that may increase the surface area of the fin, to resist movement of the post when inserted into the ground.

In an exemplary embodiment the fin may include a series of alternating ridges and grooves on opposing surfaces. In an exemplary embodiment the series of ridges and grooves may be substantially corrugated in structure.

In an exemplary embodiment the alternating ridges and grooves may be transverse to the longitudinal axis of the shaft. As well as providing increased surface area in comparison with a flat surface, it is envisaged that this transverse orientation may be particularly effective in resisting pulling of the post from the ground.

In an exemplary embodiment the foot may include a flange extending from the elongate shaft portion at a position distal from the tip of the post.

The flange may act as a height gauge so the installer can ram the post to the same depth each time. This reduces the installation time as the installer does not have to continually check the height of the post.

It is also envisaged that the flange may be used as a ramming face for the post. Ramming a long thin post into the ground from the top could have a higher likelihood of buckling the post. In contrast, ramming against the flange close to the ground may reduce the likelihood of this occurring.

According to one aspect of the present disclosure there is provided a post, including a shaft. The post may include a foot at one end of the shaft, configured to be inserted into the ground to locate the post in place, wherein the foot includes at least one fin extending along at least a portion of its longitudinal axis, the fin including a series of alternating ridges and grooves on at least one surface.

According to one aspect of the present disclosure there is provided a method for manufacturing a post substantially as herein described, including positioning the shaft within a cavity of an overmolding mold. The method may also include introducing material into the mold to form the overmold layer on the shaft.

Features may need to be created to position the shaft in the cavity of the mold tool. These features may be provided at each end of the shaft, and also evenly spaced along the length of the post. It should be appreciated that the number of features may depend on the length of the post, the rigidity of the shaft being overmolded, and the wall thickness of the overmold layer that needs to be maintained.

It is envisaged that this positioning may be achieved in a number of ways. By way of example, the shaft can be made longer than the desired overmold detail, i.e. the shaft can extend past the detail of the overmolded shape. Doing this allows the shaft to be positioned in the mold, and the toolmaker can optionally use external clips to hold the rod in position without these clips becoming caught in the overmold. Any excess rod can also be trimmed off later if necessary.

As a further example, one or more additional molded parts can be fitted to the fiberglass rod prior to overmolding. In an exemplary embodiment, the tip cap may be fitted to one end of the shaft prior to introducing the material into the mold to form the overmold layer on the shaft. In an exemplary embodiment the tip cap may be fitted to the shaft prior to positioning within the cavity. This may have a number of benefits. For example, different materials may be used for different parts of the post. As an example the tip cap may be molded from a relatively harder material such as glass filled nylon, or a metal such as steel or aluminum. This may provide a stronger point for inserting the post into the ground, in comparison with the softer material of the overmold layer. It may also provide a softer shut surface for the overmold molding tool to clamp onto, and the mold detail of the cap can be dimensional more accurate than a fiberglass rod. The cap may also be used to protect the end of the shaft, and if the shaft is hollow, block off the end so plastic does not extrude up the inside.

In another example, clips may be used to hold the shaft in place along the length of the cavity and are overmolded during the molding process. This method may require more time, as the clips need to be loaded into the mold tool prior to loading the shaft. The mold tool may also need to have features on it to locate the plastic clips.

As a further example, features in the mold tool detail may be used to locate the shaft. This may allow the shaft to be fitted into the tool quickly and without confusion. For this option it may be advantageous for the detail to match or fit in with the main post detail (i.e. desired features of the overmold layer) so that it does not look out of place. For example, exemplary embodiments of the stress relief feature substantially as described above may be positioned to provide even spaces for the location of the shaft and also reduce the amount of shrinkage each section of post will see along the entire length of the post.

Exemplary embodiments of the present disclosure may use one of more of the above locating methods. In general, benefits may include reducing the number of parts to be loaded into the mold tool, reducing the time to load the inserted parts into the mold tool, assisting in maintaining centralisation of the shaft along the length of the cavity to maintain a consistent wall thickness, allowing versatility for new options further down the track, i.e. different end caps, and maintaining a reasonable distance between each of the locating features.

According to one aspect of the present disclosure there is provided a fence system, including a plurality of posts substantially as herein described, and a plurality of wire locating attachments substantially as herein described.

According to one aspect of the present disclosure there is provided a fence system, including a plurality of posts substantially as herein described, inserted into the ground; a plurality of wire locating attachments substantially as herein described, secured to each of the posts; and at least one wire suspended by the wire locating attachments, between the posts.

According to one aspect of the present disclosure there is provided a method of installing a fence system, including: inserting a plurality of posts substantially as herein described into the ground; and securing a plurality of wire locating attachments substantially as herein described to the posts, such that at least one wire is suspended by the wire locating attachments between the posts.

BRIEF DESCRIPTION OF DRAWINGS

Further aspects of the present invention will become apparent from the following description which is given by way of example only and with reference to the accompanying drawings in which:

FIG. 2A is a perspective view of an end of the exemplary post with an exemplary end cap removed;

FIG. 2B is a perspective view of the end of the exemplary post with the exemplary end cap attached;

FIG. 5A is a perspective view of an exemplary wire attachment feature for the exemplary post;

FIG. 9 is a perspective view of a fence including a plurality of the exemplary posts.

DETAILED DESCRIPTION

Figure 1A:
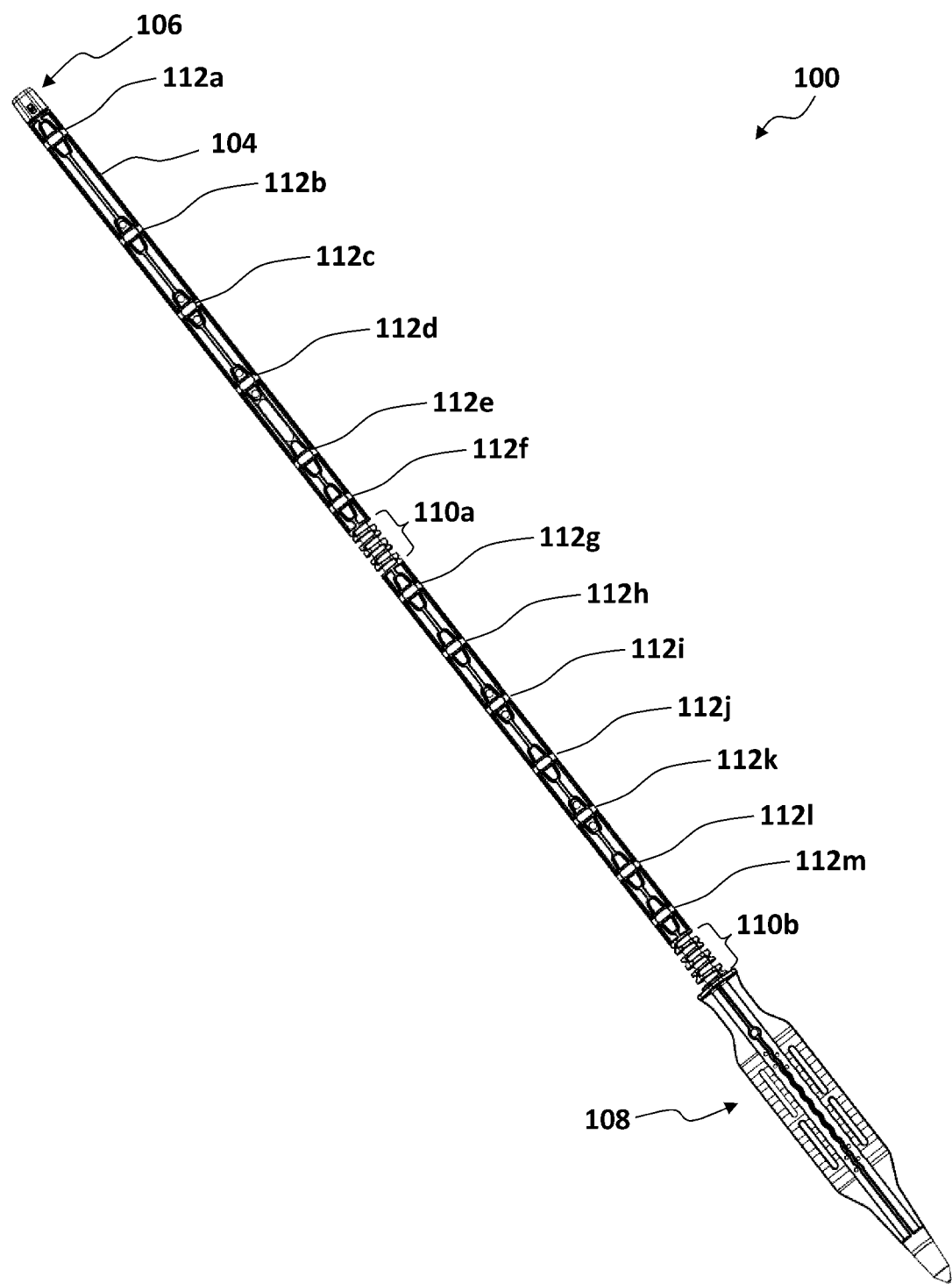
FIG. 1A is a front view of an exemplary post according to an aspect of the present disclosure.

FIG. 1A illustrates a fence post 100. The post 100 has a core shaft 102 (not clearly seen in FIG. 1A, but see FIG. 1B) onto which an overmold layer 104 (herein referred to as "the overmold") is applied. The post 100 has a head 106 at one end, and a foot 108 at the other end distal from the head 106.

The overmold 104 includes a first stress relief feature 110a at a mid-point between the head 106 and the foot 108, and a second stress relief feature 110b adjacent to the foot 108. The stress relief features 110a and 110b will be described in greater detail below.

The overmold 104 also includes a plurality of external attachment locating features for selectively securing wire locating attachments (not illustrated in FIG. 1A) at predetermined locations 112a-112m along the length of the post 100 between the head 106 and the second stress relief feature 110b. Details of the attachment locating features will be described further below.

Figure 1B:
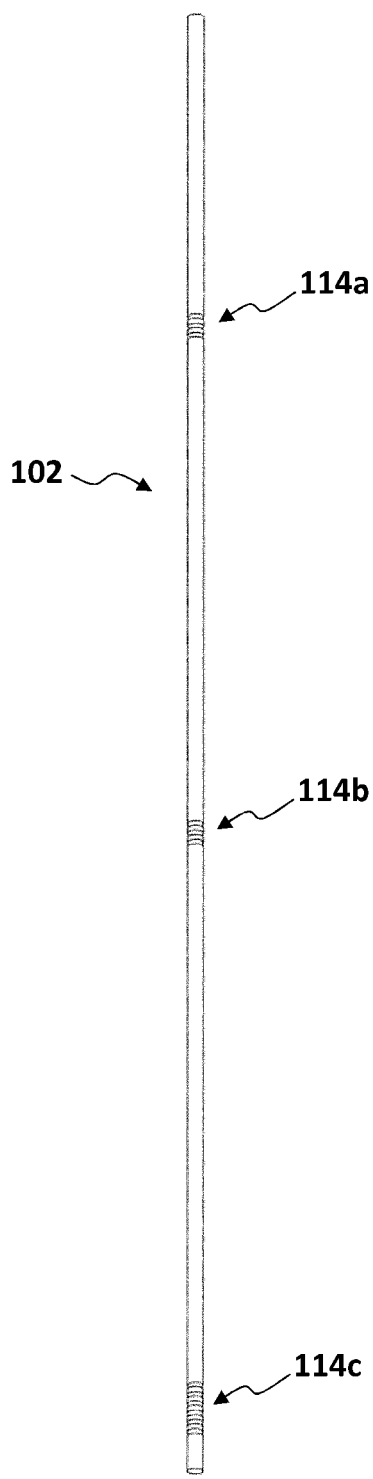
FIG. 1B is a perspective view of an exemplary rod for use in the post.

Referring to FIG. 1B, in this exemplary embodiment the shaft 102 is a rod having a solid cross-section with a diameter of approximately 16.0 mm and made of fiberglass—and may herein be referred to as "the rod".

Figure 1C:
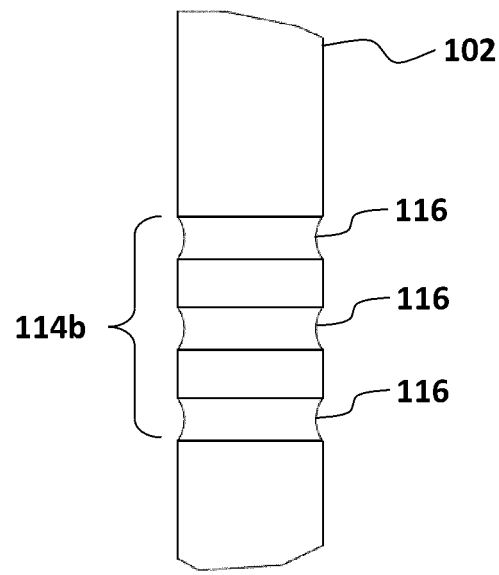
FIG. 1C is a side enlarged view of the exemplary rod.
Figure 1D:
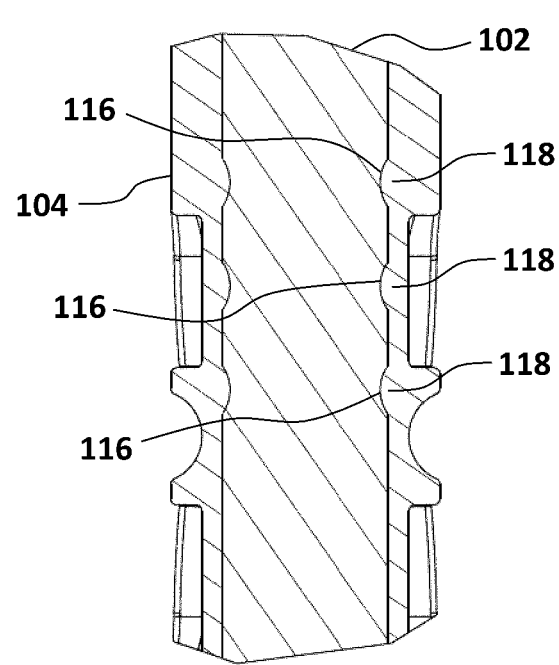
FIG. 1D is a side cross-sectional view of the exemplary post.

The rod 102 includes a number of external locating features spaced apart at several locations 114a-c along its length. Referring to FIG. 1C, the external locating features are annular grooves 116, which guide the formation of internal rings 118 on the overmold 104 during molding (as seen in FIG. 1D). The interlocking grooves 116 and rings 118 restrict longitudinal movement of the rod 102 relative to the overmold layer 104.

Referring to FIG. 2A, at the head 106 of the post 100, the rod 102 projects beyond a first end 120 of the overmold 104 by approximately 13 mm. In this exemplary embodiment the rod 102 initially extends above the overmold 104 by 8 mm, but the overmold 104 may shrink down the rod 102 by approximately 5 mm following molding.

Figure 2C:
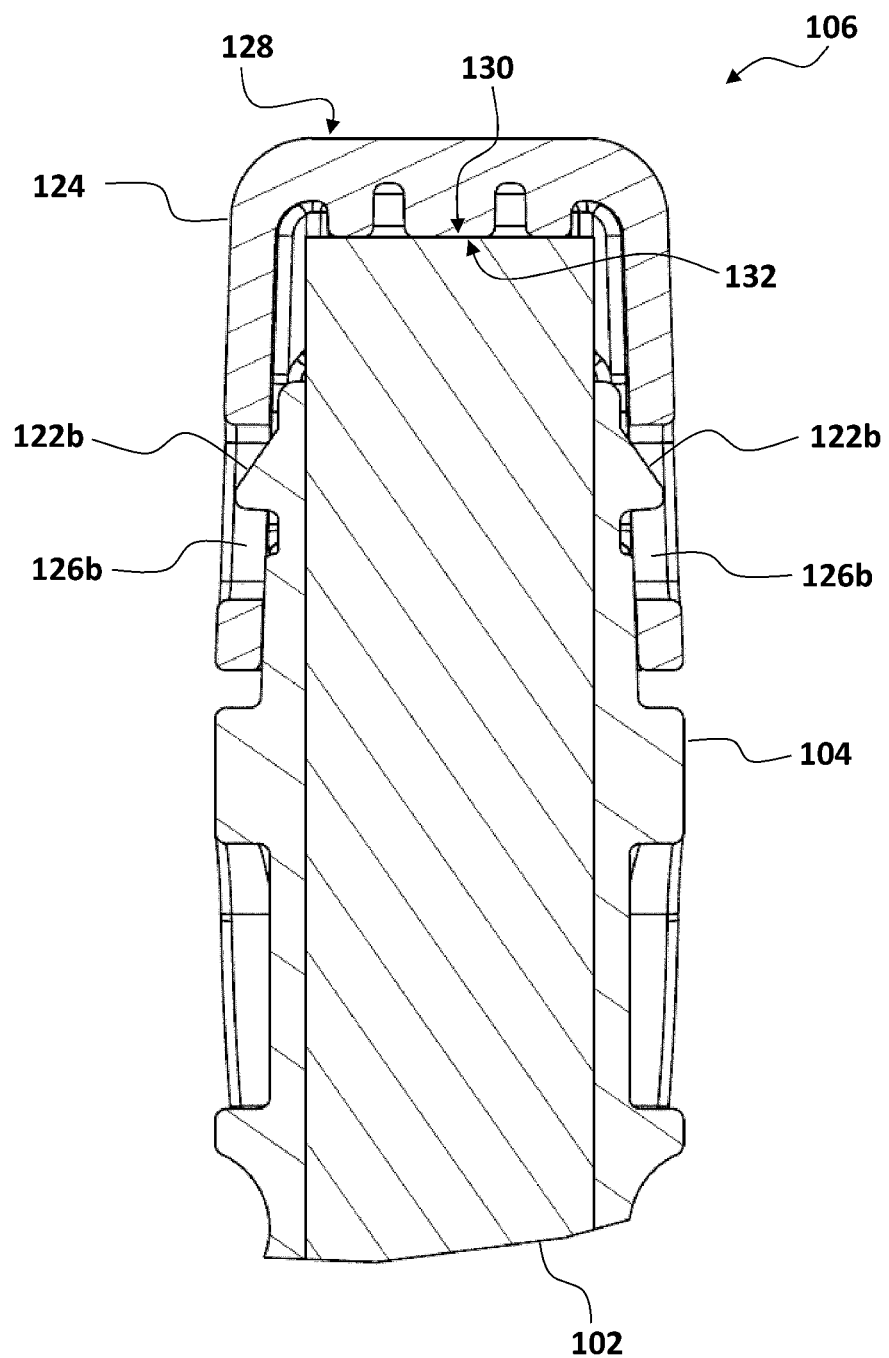
FIG. 2C is a side cross-sectional view of the end of the exemplary post.

Two barbs 122a and 122b are located on opposite sides of the first end 120. As seen in FIG. 2B, the post includes a cap 124 made of glass fibre reinforced nylon, configured to fit over the exposed end of the rod 102 and including fastener apertures 126a (and 126b—as seen in FIG. 2C) into which the barbs 122a (and 112b—as seen in FIG. 2C) may project to locate the cap 124 relative to the overmold 104. The slot shaped nature of the fastener apertures 126a and 126b accommodates shrinkage of the overmold 104.

Referring to FIG. 2C, the cap 124 includes an end portion 128 having an inner surface 130 which may bear against a first end surface 132 of the rod 102. Further, the interior surface of the sides of the cap 124 may include a plurality of radially extending ribs to grip onto the rod 102, centralize the cap 124 relative to the longitudinal axis of the rod 102, and limit longitudinal movement along the rod 102 during ramming.

Figure 3A:
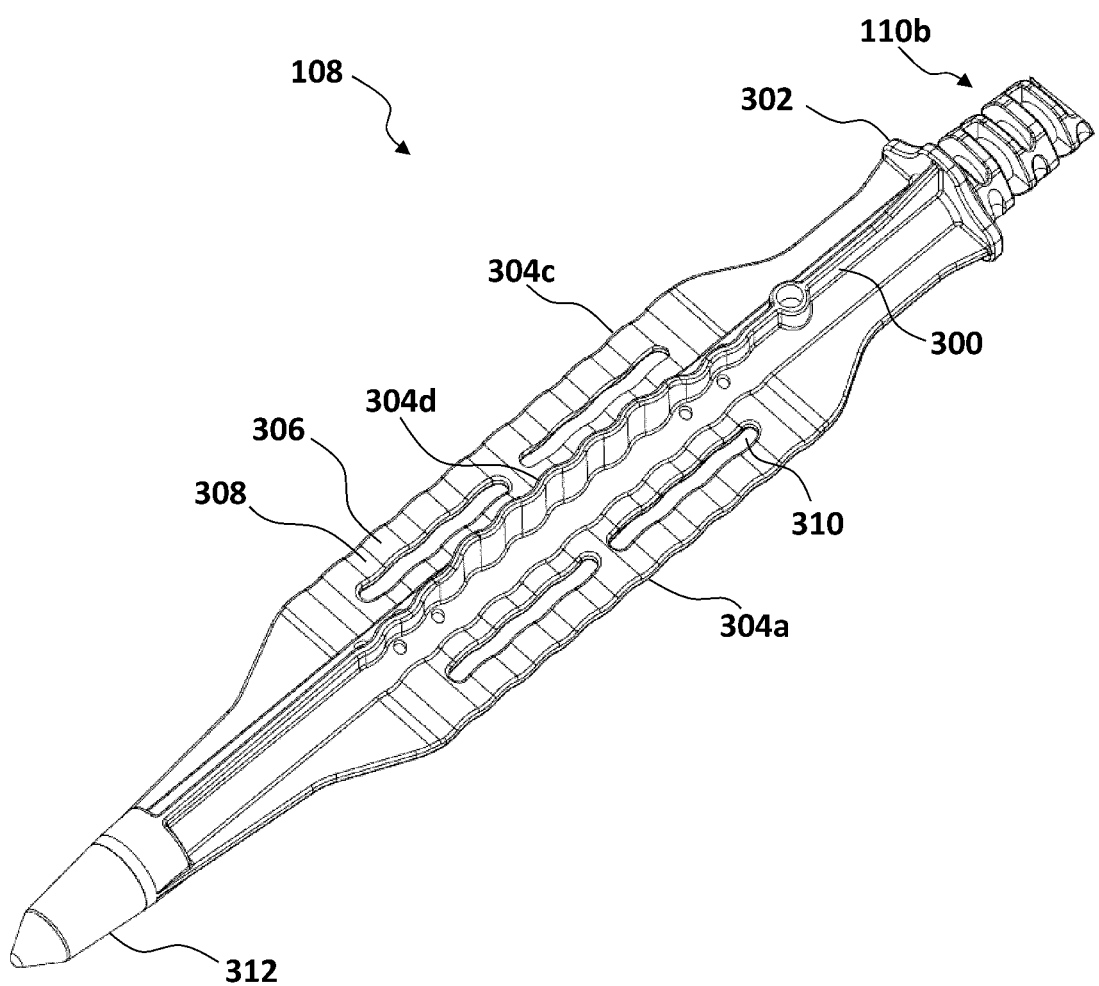
FIG. 3A is a perspective view of an exemplary foot of the exemplary post.

FIG. 3A shows the foot 108 of the post 100 in greater detail. The foot 108 includes a shaft portion 300, with a flange 302 between the shaft portion 300 and the second strain relief feature 110b of the post 100. Four fins 304a-d (fin 304b not shown in FIG. 3A, see FIG. 3C) are evenly spaced around the shaft portion 300, extending radially from its longitudinal axis.

Each of the fins 304a-d includes a series of transverse ridges 306 and grooves 308 forming a corrugated pattern through a central portion of each of the fins 304a-d. By way of example, the corrugations may have an amplitude of approximately 2 mm (plus the wall thickness of the fin 304a-d) and a pitch of approximately 8.8 mm. In the exemplary embodiment illustrated, each fin 304a-d includes at least one slot 310.

Figure 3B:
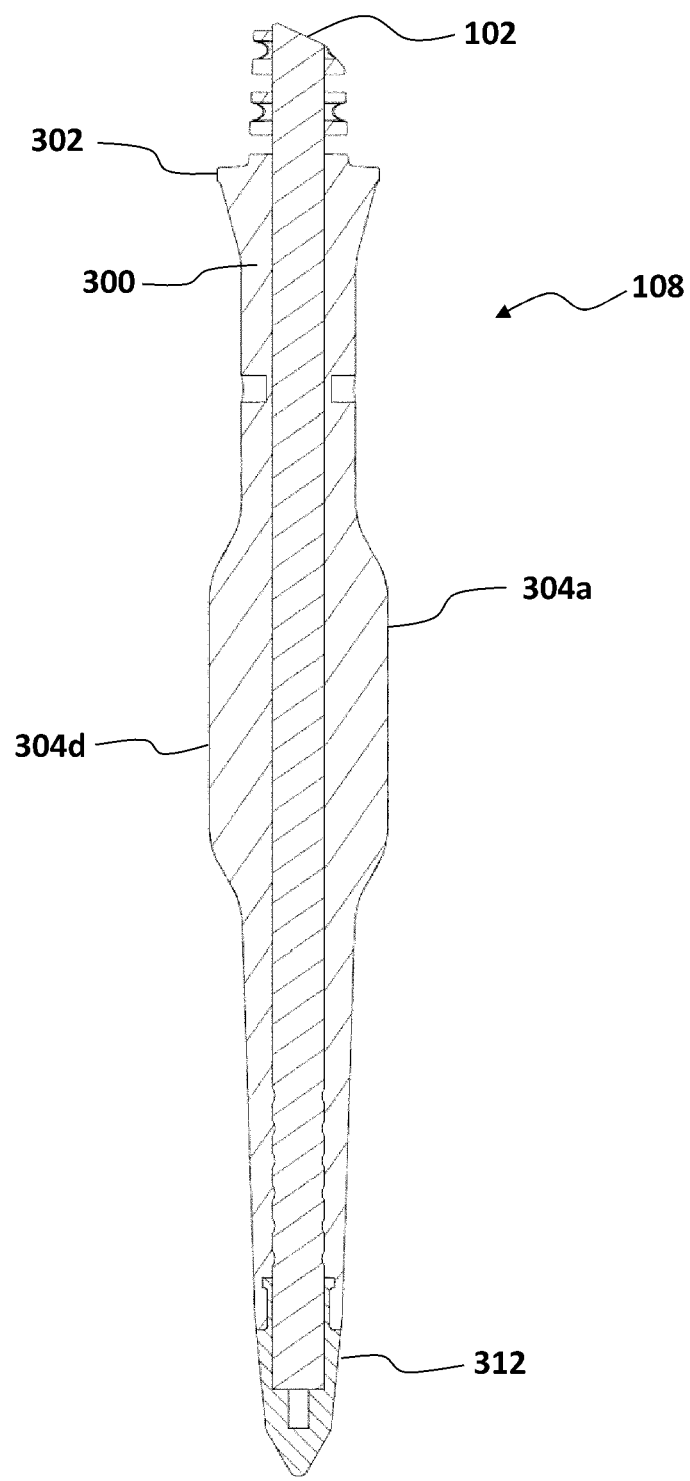
FIG. 3B is a side cross-sectional view of the foot of the exemplary post.
Figure 3C:
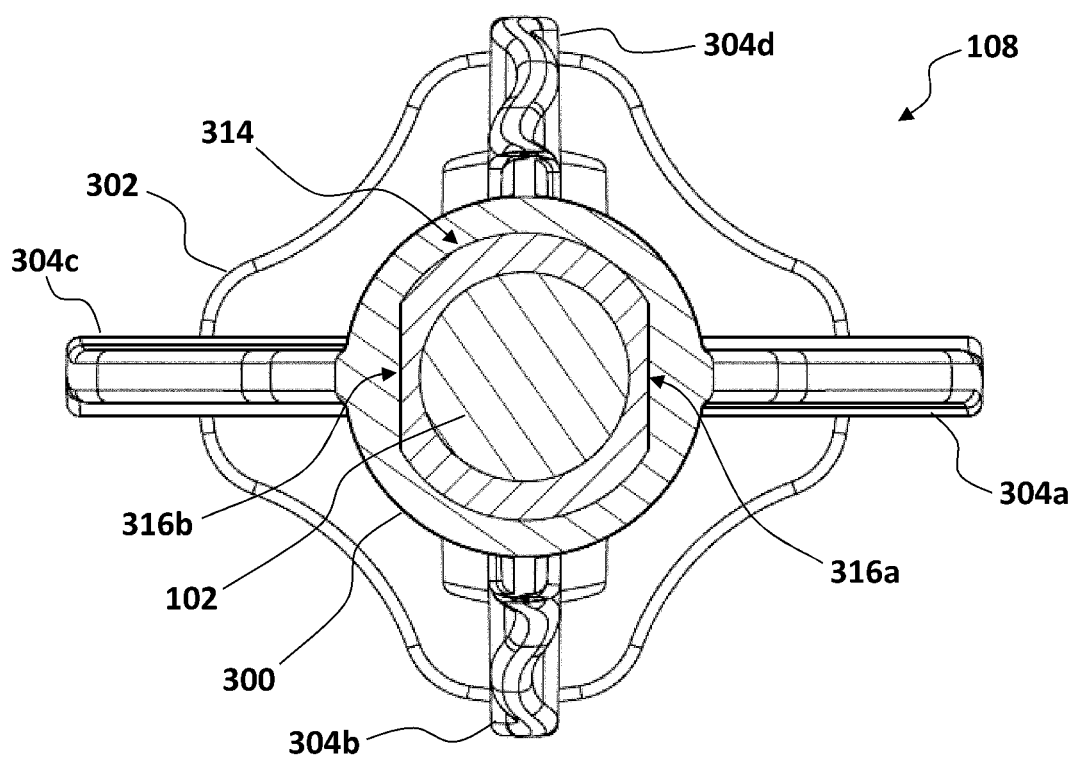
FIG. 3C is an end cross-sectional view of the foot of the exemplary post.
Figure 3D:
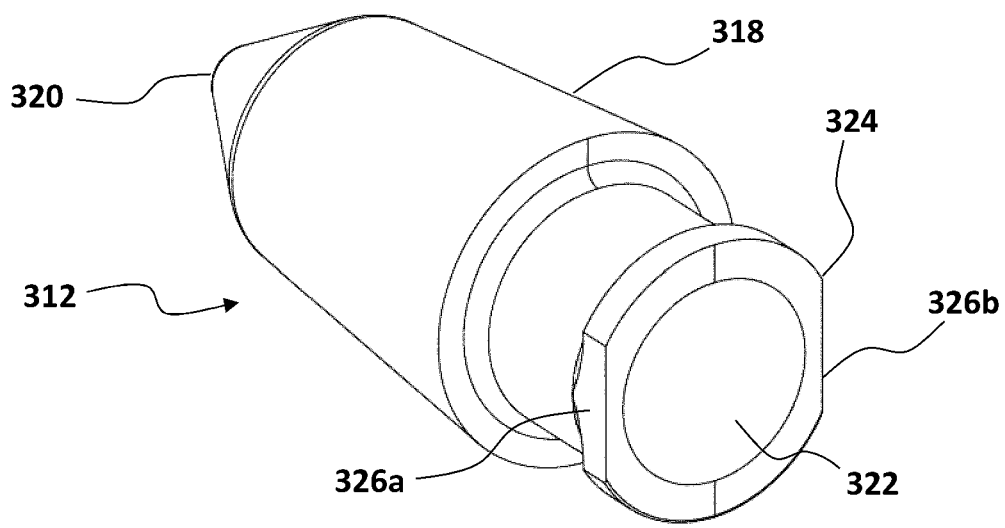
FIG. 3D is a perspective view of an exemplary cap tip for the exemplary foot.

Similar to the head 106 of the post, the foot 108 is capped by a separate part: tip 312. Referring to FIG. 3B, the rod 102 extends through the entirety of the shaft portion 300 of the foot, and projects beyond its end. The tip 312 fits over the exposed end of the rod 102. As seen in FIG. 3C, the interior 314 of the foot 108 at its end includes planar key surfaces 316a and 316b. The tip 312 (as seen in FIG. 3D) has a body 318 with a conical nose 320 at one end. At its other end the tip 312, a cavity 322 provides for receiving the exposed end of the rod 102 (as seen in FIG. 3B), with a key flange 324 having opposing keying surfaces 326a and 326b on its exterior against which the planar key surfaces 316a and 316b of the foot 108 (as seen in FIG. 3C) are formed during molding.

Figure 3E:
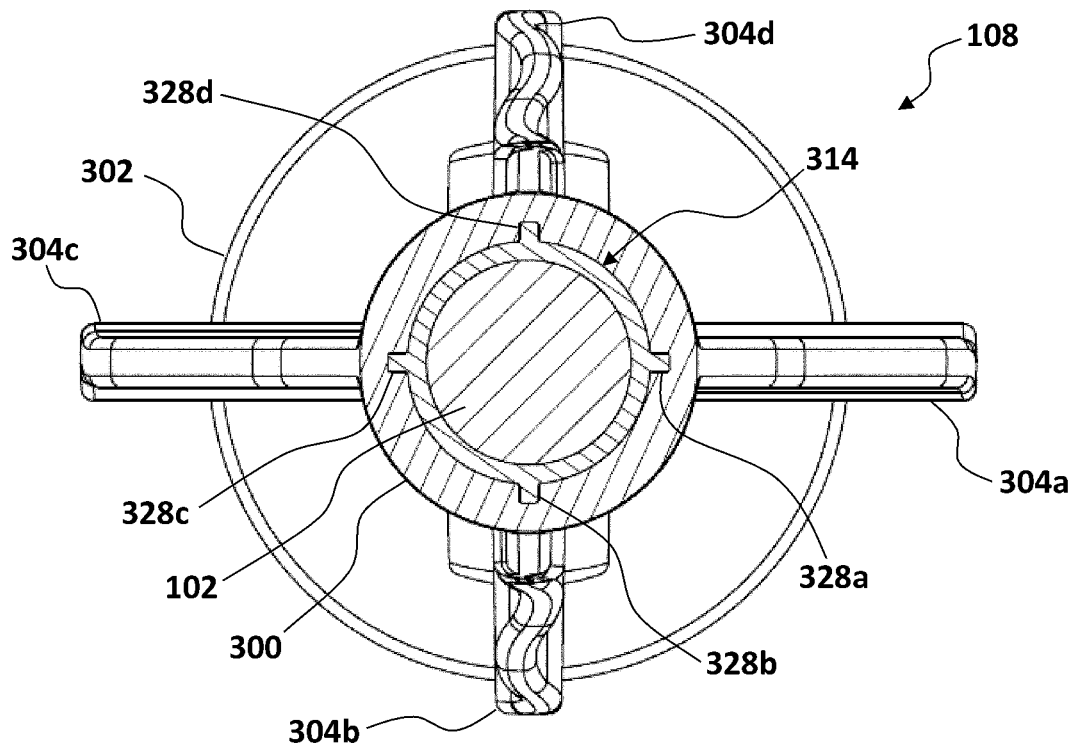
FIG. 3E is an end cross-sectional view of another exemplary embodiment of a foot of the exemplary post.
Figure 3F:
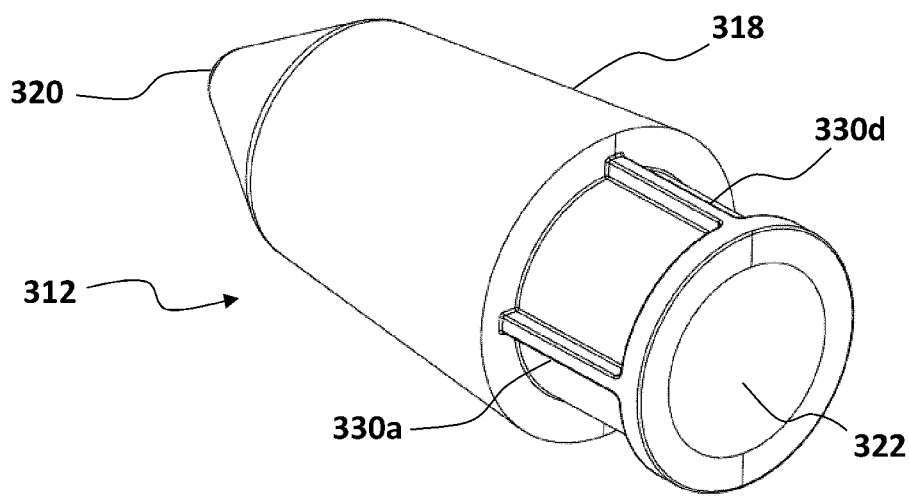
FIG. 3F is a perspective view of another exemplary cap tip for the exemplary foot.

FIG. 3E, illustrates an alternative embodiment to FIG. 3C, in which the interior 314 of the foot 108 at its end includes a plurality of indents 328a-d. The tip 312 (as seen in FIG. 3F) has a number of protrusions 330a-d spaced around its exterior about which the indents 328a-d of the foot 108 (as seen in FIG. 3E) are formed during molding.

Figure 4A:
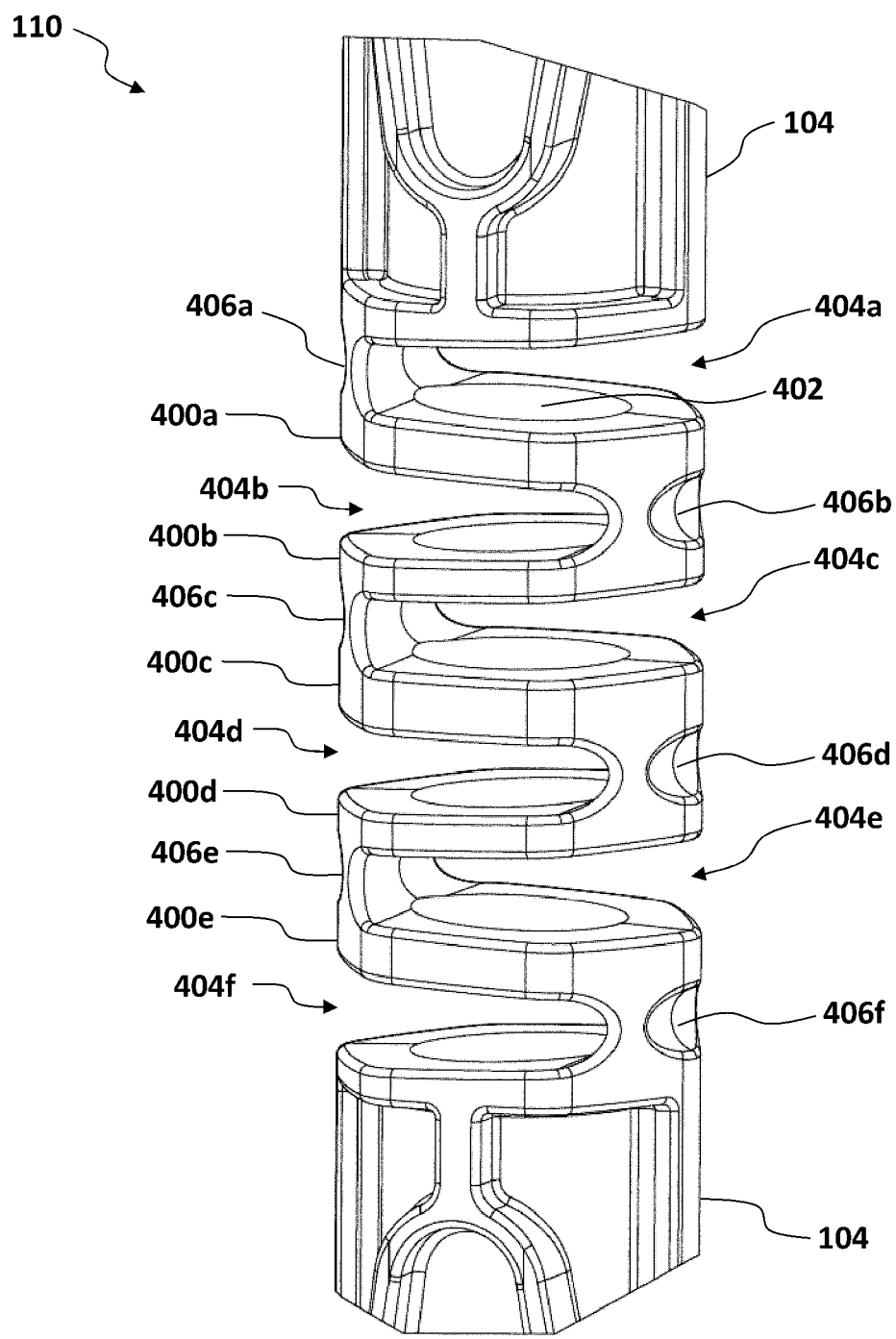
FIG. 4A is a perspective view of an exemplary stress relief feature for the exemplary post.
Figure 4B:
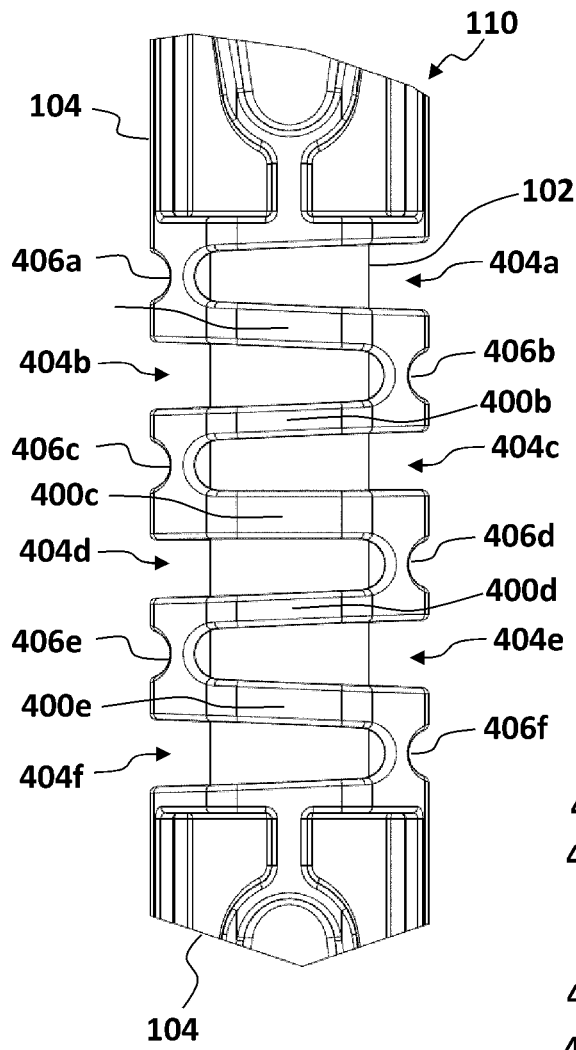
FIG. 4B is a side view of the exemplary stress relief feature.
Figure 4C:
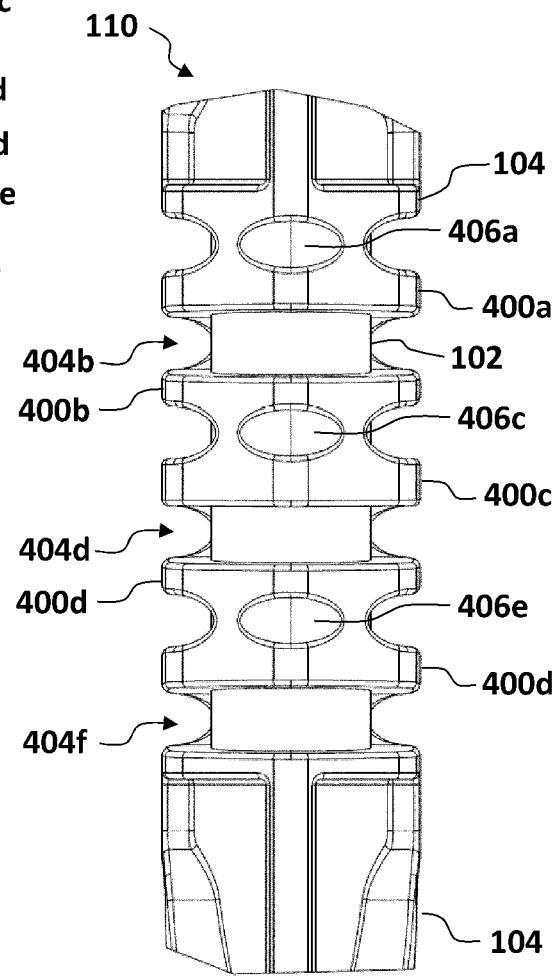
FIG. 4C is a front view of the exemplary stress relief feature.

FIG. 4A-C illustrate the structure of the stress relief feature 110, extending continuously between solid portions of the overmold 104. The stress relief feature 110 includes a plurality of transverse stress relief members in the form of disks 400a-e, having a central bore 402 (in which the rod 102 is located—see FIG. 4B and FIG. 4C).

The disks 400a-e are produced by forming transverse slots 404a-f on alternating sides of the overmold 104 along the length of the stress relief feature 110, leaving neighboring disks 400a-e connected by vertical link members 406a-f. Each disk 400a-e and vertical link member 606a-f essentially acts as a cantilever beam—allowing flexure in each cantilever beam, and therefore the stress relief feature as a whole.

Stress produced by shrinkage of the overmold 104 is accommodated by this flexure, reducing the likelihood of material failure and the formation of cracks. Similarly, the flexure may accommodate stress on the overmold 104 while the post is in use—for example if a load is applied by an animal brushing against the fence.

As seen in FIG. 1A, the stress relief features 110a and 110b have been positioned at approximately equal spacing from the head 106. Referring to FIG. 1B, the sets of groves 114a and 114b on the fiberglass rod 102 are positioned be located approximate the middle of each section of overmold 104 between the stress relief features 110a-c. This allows each section of overmold 104 to shrink away from each stress relief features 110a-c. For the foot 108 section, in which it is envisioned that most of the shrinkage will pull the stress relief feature 110c downwards.

It is envisaged that in the middle section of the overmold 104—i.e on either side of the stress relief feature 110b—may experience a shrinkage of approximately 5 mm in each direction. As such, the stress relief feature 110b may need to accommodate in the order of 10 to 12 mm of movement.

In an exemplary embodiment the material used for the overmold 104 may be a fractional melt HDPE.

Fractional melt is defined by a melt flow index (MFI) test performed to ASTM D1238 (a standard test method for finding the MFI value). So a fractional melt plastic is one that has an MFI less than 1 g/10 min at 190° C. In this exemplary embodiment the material also has a maximum tensile strength of 27 MPa and a flexural modulas of 1370 MPa.

A person skilled in the art will appreciate that there is no specific guide or level of stress a part must be below to prevent stress cracking. The applicant has identified that reducing the likelihood of cracking is influenced by the type of material, keeping the high stress areas free of sharp corners (or stress raisers) and keeping the overall stress as low as possible. FEA analysis of the stress relief feature 110 suggests the stress in the disks 400a-e and vertical link members 406a-f is around the 13 to 14 MPa range with a couple of higher areas around the 26 MPa level. The higher levels appear to be located on smooth surfaces and do not appear to be close to stress raiser points, and as such present a relatively low risk of cracking.

In an exemplary embodiment the thickness of the disks 400a-e may be different. It is envisaged that this may assist in balancing the amount of deflection each of the disks 400a-e will move. As the stress relief feature 110 may be produced by molding onto the fiberglass rod 102, the inside surface of the stress relief feature 110 is in contact with the rod 102 when the post 100 is removed from the molding tool. The shrinkage movement does have some force behind it, but it has to overcome the frictional force between the fiberglass and the HDPE. Testing has shown that when the stress relief feature 110 is configured such that the disks 400a-e have the same thickness, the two disks 400a and 400e at each end of the stress relief feature 110 (closest to the overmolded sections) tend to move more than the next discs in. The thickness of the first arms from each end, i.e. disks 400a and 400e, may be increased to be a little more rigid and therefore pull the next disc along the axis of the fiberglass rod 102 to provide a more uniform appearance.

The tool features of the mold used to form the slots 404a-f may also be used to hold the rod 102 in place within the cavity of the mold defining the overmold 104. The connected structure of the stress relief feature also allows for a continuous flow path within the cavity through which material forming the overmold 104 may pass.

Figure 5B:
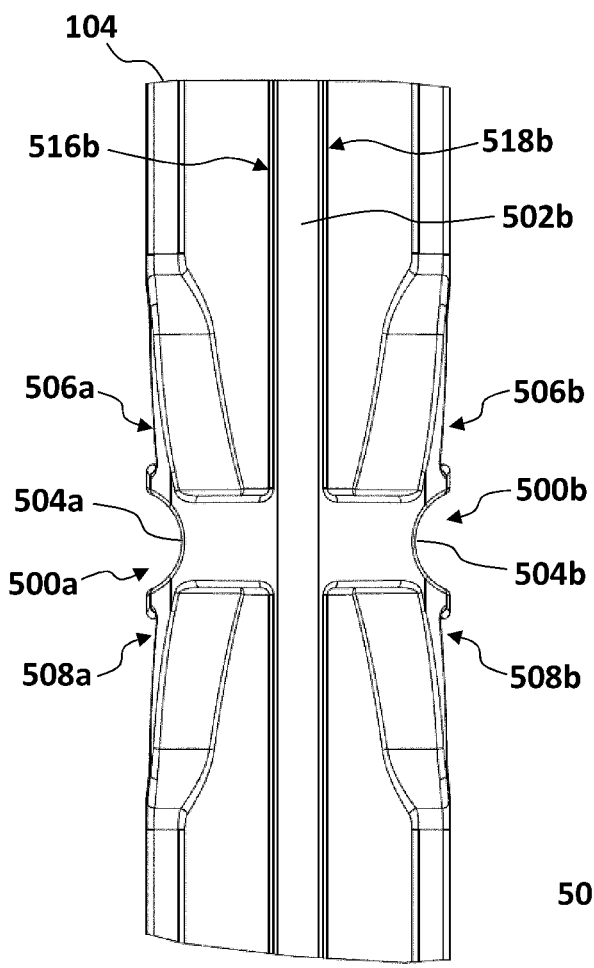
FIG. 5B is a side view of the exemplary wire attachment feature.
Figure 5C:
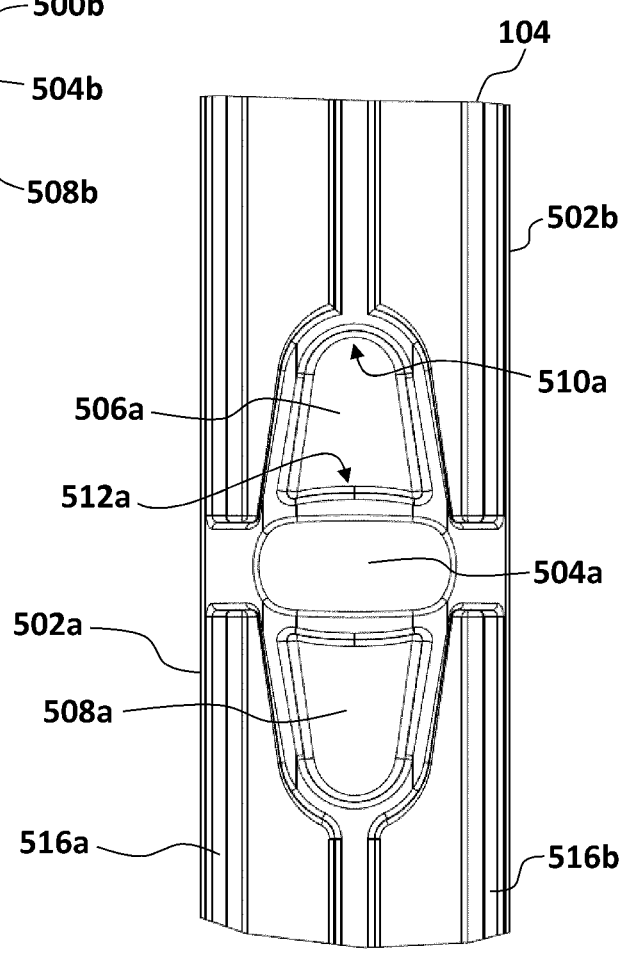
FIG. 5C is a front view of the exemplary wire attachment feature.

FIG. 5A-C illustrates front and rear attachment locating features 500a (and 500b positioned at each of the predetermined locations 112a-112m (as shown in FIG. 1A). The attachment locating features 500a and 500b may herein be referred to as "index features".

Between the index features 500a and 500b, on the sides of the overmold 104, left and right vertical ridges 502a and 502b extend the length of the overmold 104 (interrupted by the strain relief features 110a and 110b illustrated in FIG. 1A).

With reference to the front index feature 500a, each index feature includes a transverse groove 504a, with a first locating recess 506a positioned above the groove 504a, and a second locating recess 508a positioned below the groove 504a. Each of the locating recesses 506a and 508a includes a first transverse locating surface 510a facing the groove 504a, and a second transverse locating surface 512a facing away from the groove 504a.

Referring to FIG. 5B, each of the vertical ridges (for example, ridge 502b illustrated in FIG. 5B) includes a front catch surface 516b and a rear catch surface 518b.

FIG. 6A-D illustrates a wire locating attachment 600 (herein referred to as "the clip") to be secured to the post 100 using the index features. The clip 600 includes a body 602, with a first pair of arms 604 and a second pair of arms 606 extending from the body 602, with a gap 608 therebetween.

Figure 6A:
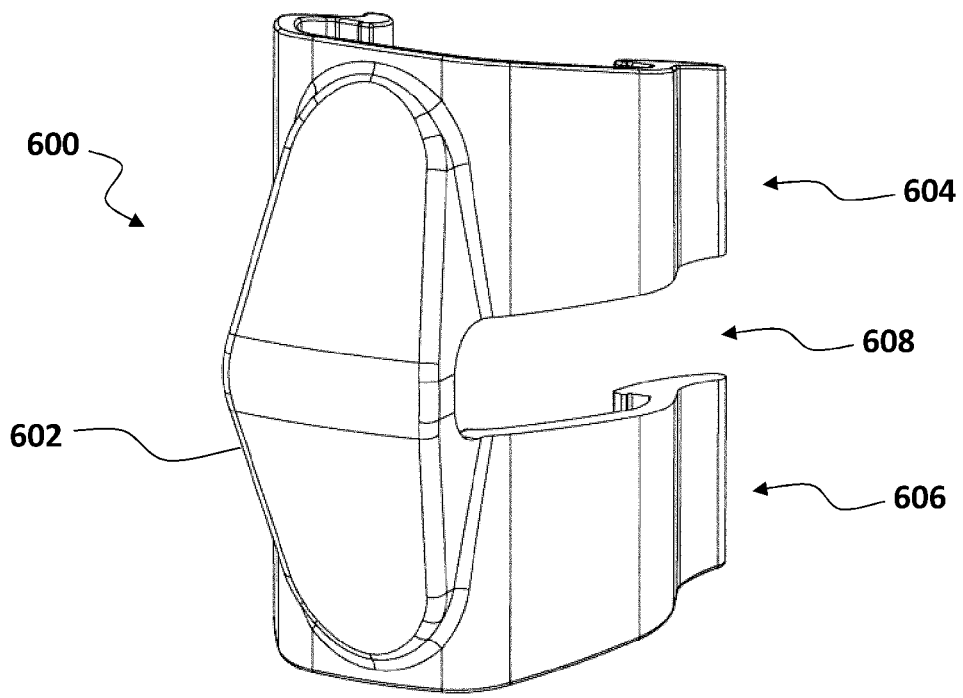
FIG. 6A is a perspective view of an exemplary wire locating attachment for use with the exemplary post.
Figure 6B:
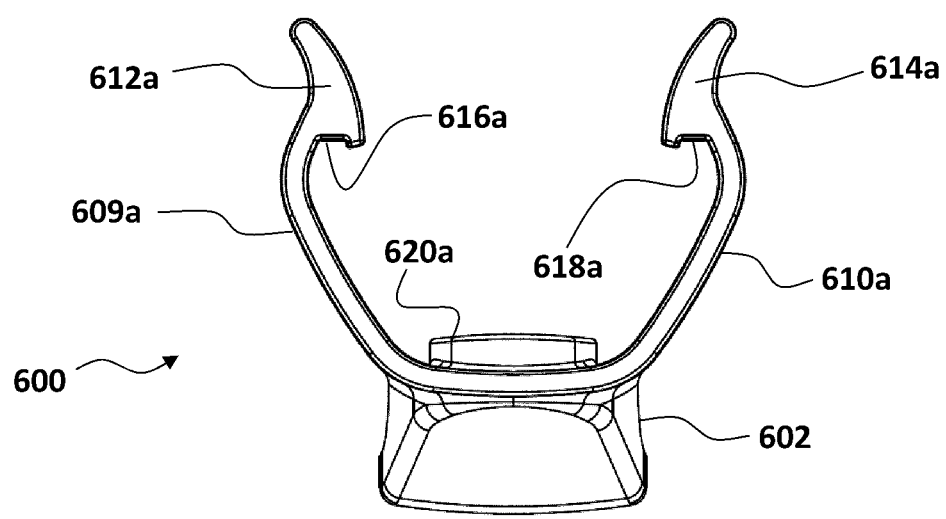
FIG. 6B is a top view of the exemplary wire locating attachment.
Figure 6C:
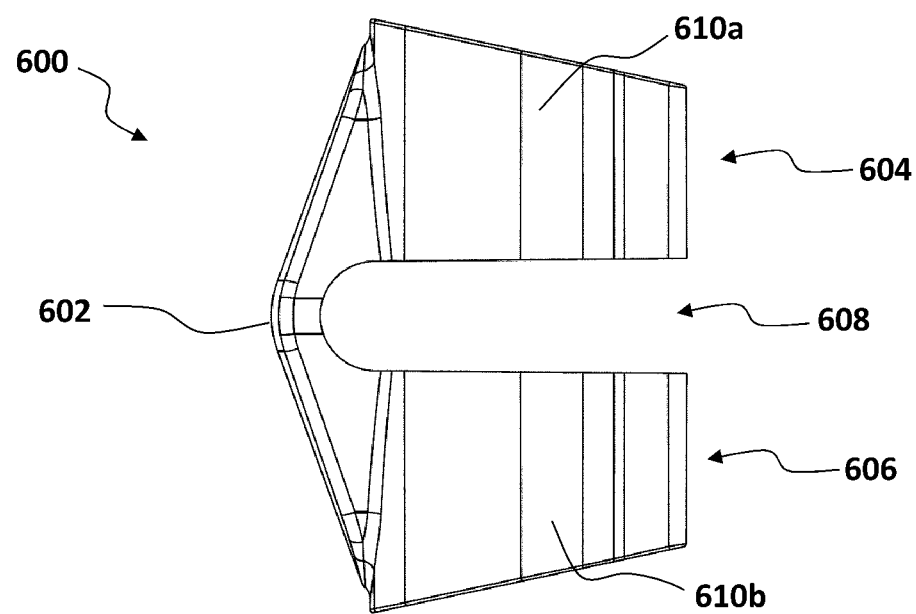
FIG. 6C is a side view of the exemplary wire locating attachment.
Figure 6D:
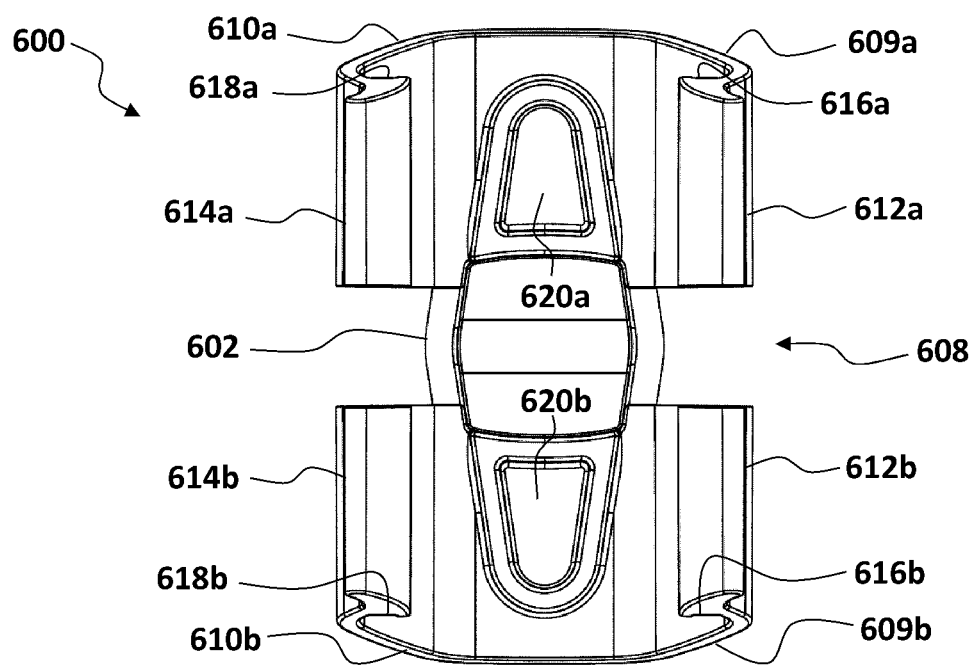
FIG. 6D is a front view of the exemplary wire locating attachment.

Referring to FIGS. 6B and 6D, each pair of arms includes a left arm 609 and a right arm 610, the arms 609 and 610 ending in an outwardly flaring barb 612 and 614 respectively. The barbs 612 and 614 include barb catch surfaces 616 and 618 respectively, facing towards the body 602. A first locating protrusion 620a and a second protrusion 620b extend from the body 602 in the same direction as the arms. The first locating protrusion 620a and second protrusion 620b are complementary in shape with the locating recesses 506 and 508 of the index features 500.

Figure 7A:
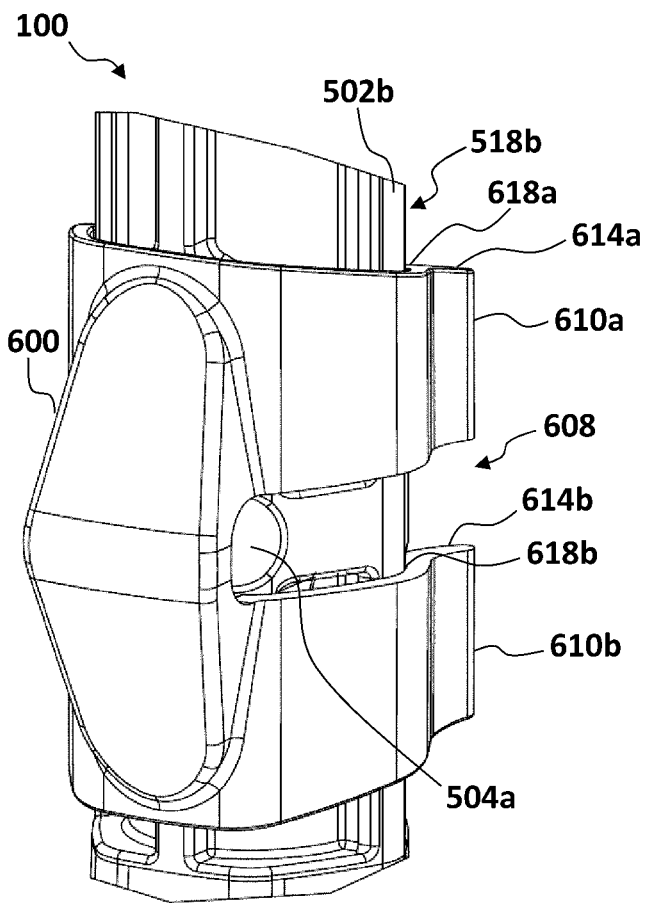
FIG. 7A is a perspective view of the exemplary wire locating attachment secured to the exemplary post.

Referring to FIG. 7A, the clip 600 may be pushed onto a desired indexing feature (for example front indexing feature 500a as shown in FIG. 5A), with the flared barbs 612 and 614 guiding the arms 610 and 614 outwardly over the vertical ridges 502. Once the barbs 612 and 614 are passed the ridges 502, the resilient nature of the arms 610 and 614 closes them such that the barb catch surfaces 616 and 618 are positioned against the rear catch surface 518b—resisting removal of the clip 600 from the post 100.

Simultaneously the first locating protrusion 620a and the second protrusion 620b are nested within the locating recesses 506a and 508a respectively, to resist movement of the clip 600 along the post 600.

Figure 7B:
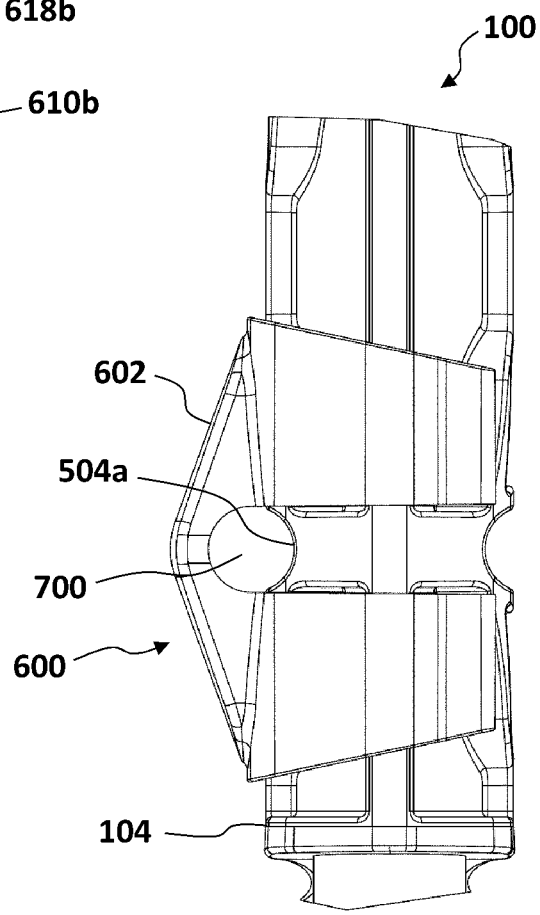
FIG. 7B is a side view of the exemplary wire locating attachment secured to the post.

In FIG. 7B, it may be seen that the body 602 of the clip 600, together with the transverse groove 504a, defines an aperture 700 through which a length of wire may pass—thereby locating the wire at a desired height.

Figure 8:
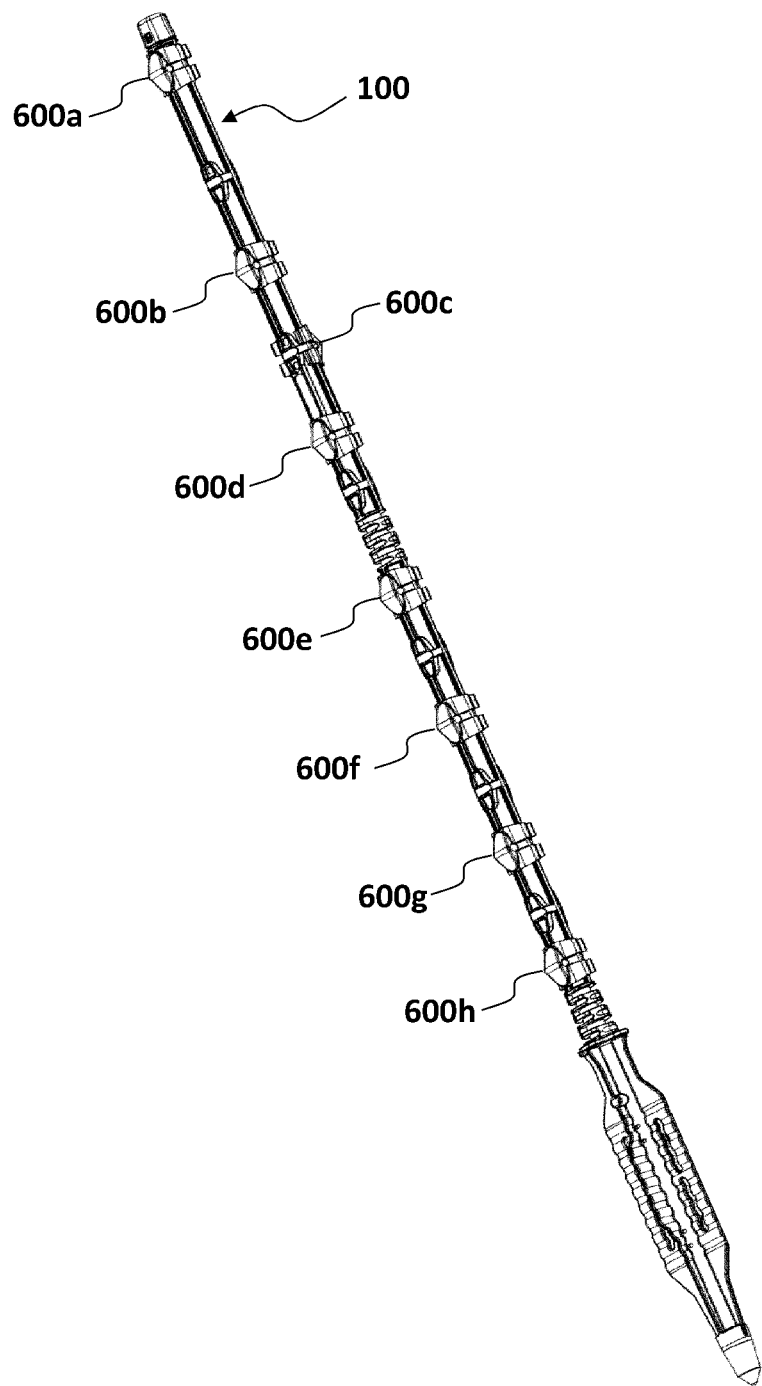
FIG. 8 is a perspective view of the exemplary post with a plurality of the exemplary wire locating attachments secured thereto.

FIG. 8 illustrates a post 100 to which a plurality of the clips 600a-h have been secured. It should be appreciated that the clips 600a-h may be secured in any number of combinations to achieve a variety of fence configurations.

FIG. 9 illustrates a fence 900, in which a number of posts 100 have been spaced apart. Wires 902a-g span between the posts 100, secured by clips 600a, 600b, and 600d-h (not clearly seen in FIG. 9, but refer to FIG. 8). In this exemplary embodiment, a strain post 904 is provided at one end of the fence 900, to which the wires 902a-g may be secured using any suitable means known in the art.

The entire disclosures of all applications, patents and publications cited above and below, if any, are herein incorporated by reference.

Reference to any prior art in this specification is not, and should not be taken as, an acknowledgement or any form of suggestion that that prior art forms part of the common general knowledge in the field of endeavor in any country in the world.

The disclosure may also be said broadly to consist in the parts, elements and features referred to or indicated in the specification of the application, individually or collectively, in any or all combinations of two or more of said parts, elements or features.

Wherein the foregoing description reference has been made to integers or components having known equivalents thereof, those integers are herein incorporated as if individually set forth.

It should be noted that various changes and modifications to the presently preferred embodiments described herein will be apparent to those skilled in the art. Such changes and modifications may be made without departing from the spirit and scope of the disclosure and without diminishing its attendant advantages. It is therefore intended that such changes and modifications be comprised within the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise.

Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various implementations other than those explicitly described are within the scope of the disclosure, and it should be appreciated that modifications and additions may be made thereto without departing from the scope thereof as defined in the appended claims.

The invention claimed is:

1. A fence post, including:
a shaft;
an overmold layer extending at least a portion of a length of the shaft,
wherein the shaft includes a plurality of external locating features, each external locating feature including a deviation in a radially outward facing surface of the shaft in contact with the overmold layer,
wherein the overmold layer includes a plurality of external attachment locating features for selectively securing wire locating attachments at predetermined locations along the length of the shaft, wherein the external attachment locating features project radially outward,
wherein each of the external attachment locating features includes at least one elongate longitudinal ridge extending longitudinally along at least a portion of a length of the fence post, and at least one elongate transverse ridge extending in a transverse direction relative to the at least one elongate longitudinal ridge,
wherein the overmold layer includes at least one stress relief feature, wherein the at least one stress relief feature includes one or more of:
a plurality of transverse stress relief members surrounding the shaft, and spaced apart along the shaft, wherein neighbouring stress relief members are connected by link members on one side of the shaft, alternating between sides along the stress relief feature;
a series of transverse slots in the overmold layer entering from different but not opposing directions;
a helix;
a necked section allowing for stretch;
one or more breaks in the overmold; and
one or more floating end caps in which shrinkage of the overmold draws the end cap tightly onto the shaft.

2. The fence post of claim 1, wherein the at least one stress relief feature is positioned between portions of the overmold layer continuously surrounding the shaft.

3. The fence post of claim 1, wherein each of the transverse stress relief members is substantially disc-shaped, having a central aperture for receiving the shaft.

4. The fence post of claim 1, wherein the stress relief feature includes at least one opening exposing the shaft.

5. The fence post of claim 1, wherein the stress relief feature is continuous with the overmold layer.

6. The fence post of claim 5, wherein the cross-sectional area of the stress relief feature at any one point in a flow path of a mold used to produce the overmold is at least 30 mm2.

7. The fence post of claim 1, wherein the shaft is made of a fibre-reinforced plastics material, and the overmold layer is made of a different plastics material to the shaft.

8. The fence post of claim 1, wherein the overmold layer extends along at least 90% of the length of the shaft.

9. The fence post of claim 1, wherein the fence post includes a first end configured to be inserted into the ground in use, and a second end distal from the first end, and wherein the fence post further includes at least one cap configured to be attached to the overmold layer and fit over an end of the shaft extending beyond the overmold layer at the second end of the fence post.

10. The fence post of claim 9, wherein the at least one cap includes one or more of: an end cap including one or more slots extending along the longitudinal axis of the fence post and configured to receive one or more lateral catches extending from the overmold layer, and a tip cap made of a tougher material than the overmold layer.

11. The fence post of claim 1, including a foot at one end of the shaft, configured to be inserted into the ground to locate the fence post in place, and having an elongate shaft portion coaxial with the longitudinal axis of the shaft, wherein the foot includes at least one of: at least one fin extending along at least a portion of the elongate shaft portion, and a flange extending from the elongate shaft portion at a position distal from the tip of the fence post.

12. A fence system, including:
a plurality of fence posts as claimed in claim 1; and
a plurality of wire locating attachments configured to be attached to the external attachment locating features of the fence posts.

13. The fence system of claim 12, wherein each wire locating attachment includes at least one pair of arms configured to extend about at least a portion of the overmold layer of the fence post, each arm having a catching surface configured to bear against the overmold layer to restrict radial movement of the wire locating attachment away from the fence post, as well as axial movement around the fence post, until released by a user.

14. The fence system of claim 12, wherein each wire locating attachment includes at least one locating feature configured to interact with at least one of the external attachment locating features of the overmold layer to restrict movement of the wire locating attachment along the longitudinal axis of the fence post until released by a user.

15. A method for manufacturing a fence post having a shaft and an overmold layer extending at least a portion of a length of the shaft, wherein the shaft includes a plurality of external locating features, each external locating feature including a deviation in a radially outward facing surface of the shaft in contact with the overmold layer, wherein the overmold layer includes a plurality of external attachment locating features for selectively securing wire locating attachments at predetermined locations along the length of the shaft, wherein the external attachment locating features project radially outward, wherein each of the external attachment locating features includes at least one elongate longitudinal ridge extending longitudinally along at least a portion of a length of the fence post, and at least one elongate transverse ridge extending in a transverse direction relative to the at least one elongate longitudinal ridge, wherein the overmold layer includes at least one stress relief feature, wherein the at least one stress relief feature includes one or more of:
a plurality of transverse stress relief members surrounding the shaft, and spaced apart along the shaft, wherein neighbouring stress relief members are connected by link members on one side of the shaft, alternating between sides along the stress relief feature;
a series of transverse slots in the overmold layer entering from different but not opposing directions;
a helix;
a necked section allowing for stretch;
one or more breaks in the overmold; and
one or more floating end caps in which shrinkage of the overmold draws the end cap tightly onto the shaft,
the method including:
positioning the shaft within a cavity of an overmolding mold; and
introducing material into the mold to form the overmold layer on the shaft.

16. The method of claim 15, wherein the stress relief feature includes at least one opening exposing the shaft, and positioning the shaft within the cavity of the overmolding mold includes locating the shaft within the overmolding mold using tool features in contact with the exposed shaft.

\* \* \* \* \*